US011008466B2

(12) United States Patent
Yamashita et al.

(10) Patent No.: US 11,008,466 B2
(45) Date of Patent: May 18, 2021

(54) CURABLE COMPOSITION, PROCESS FOR PRODUCING SAME, AND ARTICLE PRODUCED THEREWITH

(71) Applicant: DAIKIN INDUSTRIES, LTD., Osaka (JP)

(72) Inventors: Tsuneo Yamashita, Osaka (JP); Eiji Sakamoto, Osaka (JP); Saya Nii, Osaka (JP); Makoto Hanazawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 117 days.

(21) Appl. No.: 16/315,219

(22) PCT Filed: Jul. 7, 2017

(86) PCT No.: PCT/JP2017/025025
§ 371 (c)(1),
(2) Date: Jan. 4, 2019

(87) PCT Pub. No.: WO2018/008752
PCT Pub. Date: Jan. 11, 2018

(65) Prior Publication Data
US 2019/0169441 A1    Jun. 6, 2019

(30) Foreign Application Priority Data

Jul. 8, 2016 (JP) .............................. JP2016-136284
Aug. 4, 2016 (JP) .............................. JP2016-153899
Oct. 6, 2016 (JP) .............................. JP2016-198525

(51) Int. Cl.
| | | |
|---|---|---|
| *C09D 5/00* | (2006.01) | |
| *B32B 27/30* | (2006.01) | |
| *C08F 290/00* | (2006.01) | |
| *C08J 5/18* | (2006.01) | |
| *C09D 4/06* | (2006.01) | |
| *C09D 133/16* | (2006.01) | |
| *C09D 133/24* | (2006.01) | |
| *C09D 175/14* | (2006.01) | |

(52) U.S. Cl.
CPC ................ *C09D 5/00* (2013.01); *B32B 27/30* (2013.01); *C08F 290/00* (2013.01); *C08J 5/18* (2013.01); *C09D 4/06* (2013.01); *C09D 133/16* (2013.01); *C09D 133/24* (2013.01); *C09D 175/14* (2013.01)

(58) Field of Classification Search
CPC .......... C09D 5/00; C09D 4/06; C09D 133/16; C09D 133/24; C09D 175/14; C08F 290/00; C08J 5/18; B32B 27/30
USPC ........................................................ 526/204
See application file for complete search history.

(56) References Cited

U.S. PATENT DOCUMENTS

| | | |
|---|---|---|
| 2004/0181008 A1 | 9/2004 | Hanazawa et al. |
| 2013/0049255 A1* | 2/2013 | Matsumoto ........... G03F 7/0002 264/220 |
| 2013/0101791 A1 | 4/2013 | Hitschmann et al. |
| 2017/0190157 A1 | 7/2017 | Yamazawa et al. |

FOREIGN PATENT DOCUMENTS

| | | |
|---|---|---|
| EP | 0 851 246 A1 | 7/1998 |
| EP | 2 546 041 A1 | 1/2013 |
| JP | 2006-002129 A | 1/2006 |
| JP | 2006-2129 A † | 1/2006 |
| JP | 2010-159386 A † | 7/2010 |
| JP | 2010-222524 A | 10/2010 |
| JP | 2012-224709 A † | 11/2012 |
| JP | 2013-538133 A | 10/2013 |
| JP | 2013-256000 A | 12/2013 |
| JP | 2015-067709 A | 4/2015 |
| JP | 2015-83658 A | 4/2015 |
| JP | 2017-190429 A | 10/2017 |
| WO | 03/002628 A1 | 1/2003 |
| WO | 2015/068682 A1 | 5/2015 |
| WO | 2015/182744 A1 | 12/2015 |

OTHER PUBLICATIONS

Extended European Search Report dated Mar. 10, 2020, from the European Patent Office in counterpart Application No. 17824355.6.
International Preliminary Report on Patentability with the translation of Written Opinion dated Jan. 17, 2019 issued by the International Bureau in PCT/JP2017/025025.
International Search Report of PCT/JP2017/025025 dated Sep. 26, 2017 [PCT/ISA/210].
Product Guidebook of Fluorine Chemical Products of DIC Corporation, Aug. 2016 (5 pages total).

\* cited by examiner
† cited by third party

*Primary Examiner* — William K Cheung
(74) *Attorney, Agent, or Firm* — Sughrue Mion, PLLC

(57) ABSTRACT

A curable composition including a compound having a perfluoropolyether group and a curable moiety, and a curable resin and/or a curable monomer, wherein an organic solvent having no radical reactive group is not substantially contained. The curable composition is capable of forming a surface-treating layer that is in a lower clouded state.

12 Claims, No Drawings

US 11,008,466 B2

CURABLE COMPOSITION, PROCESS FOR PRODUCING SAME, AND ARTICLE PRODUCED THEREWITH

TECHNICAL FIELD

The present invention relates to a curable composition, a process for producing the same, and an article produced therewith.

CROSS REFERENCE TO RELATED APPLICATIONS

This application is a National Stage of International Application No. PCT/JP2017/025025, filed Jul. 7, 2017, claiming priority based on Japanese Patent Application Nos. 2016-136284, filed Jul. 8, 2016, 2016-153899 filed Aug. 4, 2016 and 2016-198525, filed Oct. 6, 2016.

BACKGROUND ART

It is known that when a surface-treating agent containing a fluorine-containing compound, particularly a compound having a perfluoropolyether group, is used in a surface treatment of a base material, a surface-treating layer having excellent water-repellency, oil-repellency, antifouling property, or the like can be formed. For example, Patent Literature 1 discloses a surface-treating agent obtained by reacting a composition containing a carbon-carbon double bond, which comprises (A) a triisocyanate prepared by trimerizing a diisocyanate, and (B) a combination of at least two active hydrogen-containing compounds. In this composition, the component (B) comprises (B-1) a perfluoropolyether having an active hydrogen, and (B-2) a monomer having an active hydrogen and a carbon-carbon double bond.

CITATION LIST

Patent Literature

Patent Literature 1: WO 2003/002628

SUMMARY OF THE INVENTION

Technical Problems

For such a surface-treating agent, it is desired that a surface-treating layer can be formed on the surfaces of various base materials. For example, Patent Literature 1 describes that a surface-treating layer having water-repellency, oil-repellency, and antifouling property can be provided on various base materials by using the composition having the above components.

However, it is found that a surface-treating layer formed from the surface-treating agent which has been studied in the past is in a clouded state in some cases.

An object of the present invention is to provide a curable composition capable of forming a surface-treating layer that is in a lower clouded state. Another object of the present invention is to provide a process for producing suitable for producing this curable composition.

Solution to Problems

The present invention provides a curable composition comprising:

a compound having a perfluoropolyether group and a curable moiety; and
a curable resin and/or a curable monomer,
wherein an organic solvent having no radical reactive group is not substantially contained.

The present invention provides a process for producing a curable composition comprising:

removing (C) an organic solvent having no radical reactive group from a mixture comprising
a reactive composition comprising (A) a compound having a perfluoropolyether group and a curable moiety and (C) the organic solvent, and
(B) a curable resin and/or a curable monomer.

The present invention further provides a process for producing a curable composition comprising:

mixing a reactive composition comprising (A) a compound having a perfluoropolyether group and a curable moiety and (C) an organic solvent having no radical reactive group with a solvent;
forming a precipitate containing the component (A);
separating the precipitate; and
mixing the separated precipitate with (B) a curable resin and/or a curable monomer.

The present invention further provides an article comprising:

a base material; and
a surface-treating layer which is derived from the curable composition according to any one of claims 1 to 9 and formed on a surface of the base material.

The present invention furthermore provides a film having a concavity and convexity structure on its surface,
wherein pencil hardness on the surface is 2H or more, a water contact angle on the surface is 140° or more, and an n-hexadecane contact angle on the surface is 70° or more.

Advantageous Effects of Invention

According to the present invention, it is possible to provide a curable composition capable of forming a surface-treating layer that is in a lower clouded state.

DESCRIPTION OF EMBODIMENTS

Hereinafter, the present invention will be described, but the present invention is not limited to the following description.

(Curable Composition)

A curable composition of the present invention is preferably used for treating a surface of a base material formed of various materials comprising a resin.

The curable composition of the present invention is a composition comprising (A) a compound having a perfluoropolyether group and a curable moiety (hereinafter sometimes referred to as a component (A)) and (B) a curable resin and/or a curable monomer (hereinafter sometimes referred to as a component (B)), and in this curable composition, an organic solvent having no radical reactive group is not substantially contained.

[(A) Compound Having Perfluoropolyether Group and Curable Moiety]

The curable moiety includes, but is not limited to, for example, an allyl group, a cinnamic acid group, a sorbic acid group, a substituted acryloyl group, and a methacryloyl group (hereinafter, an acryloyl group and a methacryloyl group are also collectively referred to as "(meth)acryloyl group").

Preferable curable moiety differs depending on the material to be coated, for example, when this material is an amorphous synthetic resin (for example, acrylic resin), the "curable moiety" is preferably an allyl group, a cinnamic acid group, a sorbic acid group, or $CH_2=CX_1-C(O)-$ (wherein $X_1$ represents a hydrogen atom, a chlorine atom, a fluorine atom, or an alkyl group having 1 to 10 carbon atoms which may be substituted by fluorine) (for example, (meth)acryloyl group) and more preferably an acryloyl group and a methacryloyl group.

The perfluoropolyether group is a group represented by the following formula:

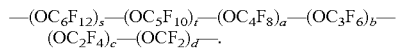

In the formula, s, t, a, b, c, and d are each independently an integer of 0 or more and 200 or less, and the sum of s, t, a, b, c, and d is at least 1. Preferably, s, t, a, b, c, and d are each independently an integer of 0 or more and 100 or less. Preferably, the sum of s, t, a, b, c, and d is 5 or more, more preferably 10 or more. Preferably, the sum of s, t, a, b, c, and d is 200 or less, more preferably 100 or less, for example, 10 or more and 200 or less, more specifically 10 or more and 100 or less. The occurrence order of the respective repeating units in parentheses with the subscript s, t, a, b, c, or d is not limited in the formula.

These repeating units may be straight or branched, preferably straight. For example, the $-(OC_6F_{12})-$ group may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, preferably $-(OCF_2CF_2CF_2CF_2CF_2CF_2)-$. The $-(OC_5F_{10})-$ group may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, preferably $-(OCF_2CF_2CF_2CF_2CF_2)-$. The $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, preferably $-(OCF_2CF_2CF_2CF_2)-$. The $-(OC_3F_6)-$ group may be any of $-(OCF_2CF_2CF_2)-$, $-(OCF(CF_3)CF_2)-$, and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$.

Preferably, the perfluoropolyether group (hereinafter sometimes referred to as PFPE) is a group represented by the following formula:

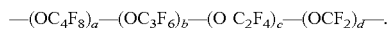

In the formula, a, b, c, and d represent the repeating number of four repeating units of perfluoropolyether, respectively, and are each independently an integer of 0 to 200, for example, an integer of 1 to 200, and the sum of a, b, c, and d is at least 1, preferably 5 to 300, more preferably 10 to 200, further preferably from 10 to 100. The occurrence order of the respective repeating units in parentheses with the subscript a, b, c, or d is not limited in the formula. Among these repeating units, the $-(OC_4F_8)-$ group may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, and $-(OCF(CF_3)CF(CF_3))-$, preferably $-(OCF_2CF_2CF_2CF_2)-$. The $-(OC_3F_6)-$ group may be any of $-(OCF_2CF_2CF_2)-$, $-(OCF(CF_3)CF_2)-$, and $-(OCF_2CF(CF_3))-$, preferably $-(OCF_2CF_2CF_2)-$. The $-(OC_2F_4)-$ group may be any of $-(OCF_2CF_2)-$ and $-(OCF(CF_3))-$, preferably $-(OCF_2CF_2)-$. The compound having the perfluoropolyether group can exert excellent water-repellency, oil-repellency, and antifouling property (for example, preventing a fouling such as fingerprints from adhering).

In one embodiment, the PFPE is $-(OC_3F_6)_b-$ (wherein b is an integer of 1 or more and 200 or less, preferably 5 or more and 200 or less, more preferably 10 or more and 200 or less). Preferably, the PFPE is $-(OCF_2CF_2CF_2)_b-$ (wherein b is an integer of 1 or more and 200 or less, preferably 5 or more and 200 or less, more preferably 10 or more and 200 or less) or $-(OCF(CF_3)CF_2)_b-$ (wherein b is an integer of 1 or more and 200 or less, preferably 5 or more and 200 or less, more preferably 10 or more and 200 or less). More preferably, the PFPE is $-(OCF_2CF_2CF_2)_b-$ (wherein b is an integer of 1 or more and 200 or less, preferably 5 or more and 200 or less, more preferably 10 or more and 200 or less).

In another embodiment, the PFPE is $-(OC_4F_8)_a-(OC_3F_6)_b-(OC_2F_4)_c-(OCF_2)_d-$ (wherein a and b are each independently an integer of 0 or more and 30 or less, c, and d are each independently an integer of 1 or more and 200 or less, preferably 5 or more and 200 or less, more preferably 10 or more and 200 or less, the sum of a, b, c, and d is at least 5, preferably 10 or more, and the occurrence order of the respective repeating units in parentheses with the subscript a, b, c, or d is not limited in the formula). Preferably, the PFPE is $-(OCF_2CF_2CF_2CF_2)_a-(OCF_2CF_2CF_2)_b-(OCF_2C OC(OCF_2)_d-$. In one embodiment, the PFPE may be $-(OC_2F_4)_c-(OCF_2)_d-$ (wherein c and d are each independently an integer of 1 or more and 200 or less, preferably 5 or more and 200 or less, more preferably 10 or more and 200 or less, and the occurrence order of the respective repeating units in parentheses with the subscript c or d is not limited in the formula).

In further another embodiment, the PFPE is a group represented by $-(R^6-R^7)_j-$. In the formula, $R^6$ is $OCF_2$ or $OC_2F_4$, preferably $OC_2F_4$. In the formula, $R^7$ is a group selected from $OC_2F_4$, $OC_3F_6$, $OC_4F_8$, $OC_5F_{10}$, and $OC_6F_{12}$, or a combination of 2 or 3 groups independently selected from these groups. Preferably, $R^7$ is a group selected from $OC_2F_4$, $OC_3F_6$, and $OC_4F_8$, a group selected from $OC_3F_6$, $OC_4F_8$, $OC_5F_{10}$, and $OC_6F_{12}$, or a combination of 2 or 3 groups independently selected from these groups. Examples of the combination of 2 or 3 groups independently selected from $OC_2F_4$, $OC_3F_6$, and $OC_4F_8$ include, but are not limited to, for example, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2_4C_2F_4C_2F_4-$, $-OC_3F_6OC_2F_4OC_3F_6-$, $-OC_3F_6OC_3F_6OC_2F_4-$, $OC_4F_8OC_2F_4OC_2F_4-$, and the like. The above j is 2 or more, preferably 3 or more, more preferably 5 or more, and is an integer of 100 or less, preferably 50 or less. In the above formulas, $OC_2F_4$, $OC_3F_6$, $OC_4F_8$, $OC_5F_{10}$, and $OC_6F_{12}$ may be straight or branched, preferably straight. In this embodiment, the PFPE is preferably $-(OC_2F_4-OC_3F_6)_j-$ or $-(OC_2F_4-OC_4F_8)_j-$.

In a preferable embodiment, the PFPE is a group of any of the following formulae (i) to (iv):

       (i)

wherein b2 is an integer of 1 to 200;

$$—(OCF(CF_3)CF_2)_{b2}— \quad \text{(ii)}$$

wherein b2 is an integer of 1 to 200;

$$—(OCF_2CF_2CF_2CF_2)_{a1}—(OCF_2CF_2CF_2)_{b1}— \\ (OCF_2CF_2)_{c1}—(OCF_2)_{d1}— \quad \text{(iii)}$$

wherein a1 and b1 are each independently 0 or an integer of 1 to 30, c1 and d1 are each independently an integer of 1 to 200, and the occurrence order of the respective repeating units in parentheses with the subscript a1, b1, c1, or d1 is not limited in the formula; or $$—(OC_2F_4—R^{18})_{n'}— \quad \text{(iv)}$$

wherein $R^{18}$ is a group selected from $OC_2F_4$, $OC_3F_6$, and $OC_4F_8$ or a combination of 2 or 3 groups independently selected from these groups. Examples of the combination of 2 or 3 groups independently selected from $OC_2F_4$, $OC_3F_6$, and $OC_4F_8$ include, but are not limited to, for example, $—OC_2F_4OC_3F_6—$, $—OC_2F_4OC_4F_8—$, $—OC_3F_6OC_2F_4—$, $—OC_3F_6OC_3F_6—$, $—OC_3F_6OC_4F_8—$, $—OC_4F_8OC_4F_8—$, $—OC_4F_8OC_3F_6—$, $—OC_4F_8OC_2F_4—$, $—OC_2F_4OC_2F_4OC_3F_6—$, $—OC_2F_4OC_2F_4OC_4F_8—$, $—OC_2F_4OC_3F_6OC_2F_4—$, $—OC_2F_4OC_3F_6OC_3F_6—$, $—OC_2F_4OC_4F_8OC_2F_4—$, $—OC_3F_6OC_2F_4OC_2F_4—$, $—OC_3F_6OC_2F_4OC_3F_6—$, $—OC_3F_6OC_3F_6OC_2F_4—$, $—OC_4F_8OC_2F_4OC_2F_4—$, and the like. n' is an integer of 2 to 100, preferably an integer of 2 to 50; in the above formulas, $OC_2F_4$, $OC_3F_6$, and $OC_4F_8$ may be straight or branched, preferably straight; and in this embodiment, PFPE is preferably $—(OC_2F_4—OC_3F_6)_{n'}—$, $—(OC_2F_4—OC_3F_6—OC_3F_6)_{n'}—$, or $—(OC_2F_4—OC_4F_8)_{n''}$.

The component (A) preferably comprises one or more compounds selected from the following compounds:

(A1) a compound further having a polyisocyanate structure, more specifically a compound further having an isocyanurate type polyisocyanate structure, (A2) a compound further having a cyclic siloxane structure, (A3) a compound further having a polyether-modified polysiloxane structure, (A4) a fluorine-containing acrylate compound, and (A5) a reaction product using a compound having a poly(perfluoroalkylene ether) chain and styryl groups at both ends of the poly(perfluoroalkylene ether) chain.

Examples of the component (A) include components having a perfluoropolyether group contained in commercially available surface-treating agents KY-1203 and KNS 5300 (manufactured by Shin-Etsu Chemical Co., Ltd.), Optool DAC and Optool DAC-HP (manufactured by Daikin Industries, Ltd.), Megafac RS-75, Megafac RS-72-K, Megafac RS-76-E, Megafac RS-76-NS, and Megafac RS-90 (manufactured by DIC Corporation), Fluorolink P56, Fluorolink P54, Fluorolink F10, Fluorolink A10P, Fluorolink AD1700, Fluorolink MD700, and Fluorolink E10H (manufactured by Solvay), and the like.

[(A1) Compound Further Having Polyisocyanate Structure]

Examples of the compound further having a polyisocyanate structure include a compound obtained by reacting (a1) a compound having an isocyanate group (—NCO group) and (b1) a compound having an active hydrogen.

[(a1) Compound Having Isocyanate Group (—NCO Group)]

Examples of the compound having an isocyanate group which is the compound (a1) include polyisocyanate. As used herein, polyisocyanate means a compound having two or more isocyanate groups in the molecule. The compound (a1) may be polyisocyanate obtained by trimerizing diisocyanate. The polyisocyanate obtained by trimerizing diisocyanate may be triisocyanate. Polyisocyanate which is a trimer of diisocyanate may exist as a polymer thereof.

Diisocyanate includes, but is not limited to, diisocyanate in which an isocyanate group is bonded to an aliphatic group, such as trimethylene diisocyanate, hexamethylene diisocyanate, isophorone diisocyanate, xylylene diisocyanate, hydrogenated xylylene diisocyanate, cyclohexane diisocyanate, dicyclohexyl methane diisocyanate, and norbornane diisocyanate; and diisocyanate in which an isocyanate group is bonded to an aromatic group, such as tolylene diisocyanate, diphenylmethane diisocyanate, polymethylene polyphenyl polyisocyanate, tolidine diisocyanate, and naphthalene diisocyanate.

In a preferable embodiment, the compound (a1) may be isocyanurate type polyisocyanate. The isocyanurate type polyisocyanate may exist as a polymer thereof. That is, the isocyanurate type polyisocyanate may be a monocyclic compound having only one isocyanurate ring, or a polycyclic compound which is obtained by polymerization of the monocyclic compound, or a mixture thereof. The isocyanurate type polyisocyanate is commercially available, for example, as SUMIDUR (registered trademark) N3300 (manufactured by Sumitomo Bayer Urethane Co., Ltd.).

Specific examples of the polyisocyanate include, but are not limited to, a compound of the following structure:

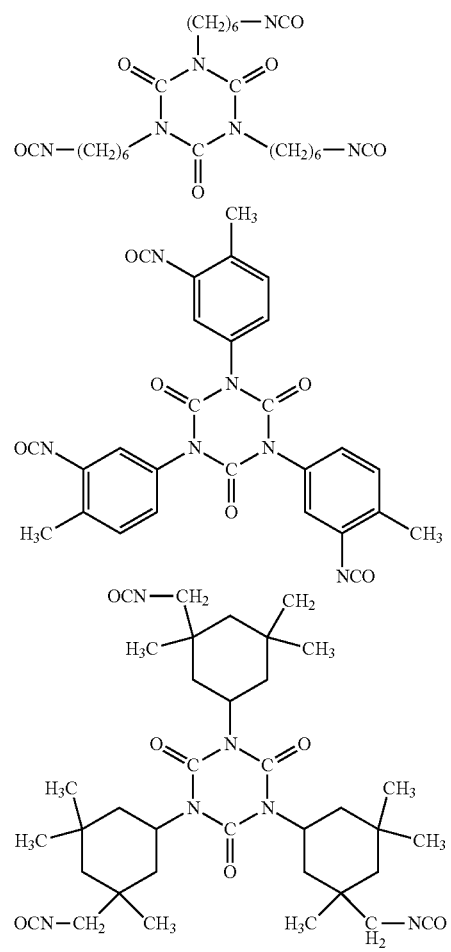

-continued

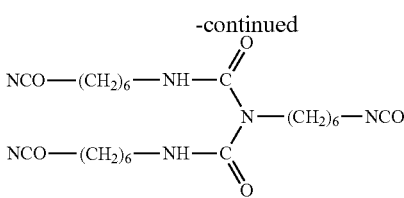

As mentioned above, these polyisocyanate may exist as a polymer, for example, when the polymer is isocyanurate type polyisocyanate of hexamethylene diisocyanate, it may exist as a polymer of the following structure:

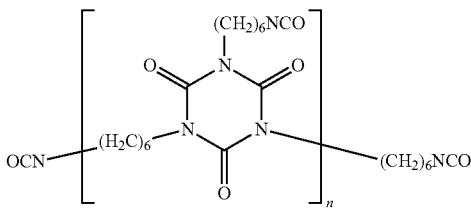

[(b1) Compound Having Active Hydrogen]

The compound (b1) preferably contains the following two components:

(b1-1) a compound having an active hydrogen and a perfluoropolyether group, and (b1-2) a monomer containing an active hydrogen and a carbon-carbon double bond. More preferably, the compound (b1) further contains (b1-3) a compound having another active hydrogen.

As used herein, "active hydrogen" means a hydrogen atom that may be donated as a proton to an isocyanate group. Examples of an active hydrogen-containing group include an —OH group, a —C(=O)H group, a —SH group, a —SO$_3$H group, a —SO$_2$H group, a —SOH group, an —NH$_2$ group, an —NH— group, a —SiH group, and the like. For example, in the case where an active hydrogen contained in the compound (b1) is an —OH group, a urethane bond is formed by reacting the compound (a1) and the compound (b1).

In the compound (b1) and the compound (a1), it is preferable that a molar account of an active hydrogen in the compound (b1) be equal to a molar account of an isocyanate group in the compound (a1). For example, when the compound (b1) has one active hydrogen-containing functional group, it is preferable that a molar account of the compound (b1) be equal to a molar account of the isocyanate group in the compound (a1).

[(b1-1) Compound Having Active Hydrogen and Perfluoropolyether Group]

The compound (b1-1) is a compound containing an active hydrogen and a perfluoropolyether group, and, for example, may be a compound having a group containing one active hydrogen at one molecular terminal, such as a hydroxyl group, or having a hydroxyl group at each of two terminals, in addition to the perfluoropolyether group. The perfluoropolyether group has been described above, and thus overlapping explanation thereof will be omitted.

The compound (b1-1) has a number average molecular weight of 500 to 12,000, preferably 1,000 to 10,000, more preferably 1,500 to 8,000, but not limited thereto. In the present invention, the "average molecular weight" means the number average molecular weight, and the "average molecular weight" is defined as a value measured by using $^{19}$F-NMR.

Preferably, the compound (b1-1) may be at least one compound of any of the following general formulae (b1-1-i) and (b1-1-ii):

$$Rf^1\text{—PFPE-}R^1\text{—CH}_2\text{OH} \quad (b1\text{-}1\text{-}i)$$

$$HOCH_2\text{—}R^1\text{-PFPE-}R^1\text{—CH}_2\text{OH} \quad (b1\text{-}1\text{-}ii).$$

Here, PFPE is as described above.

In the formulae (b1-1-i) and (b1-1-ii), $Rf^1$ represents an alkyl group (for example, straight or branched) having 1 to 16 carbon atoms which may be substituted by one or more fluorine atoms, preferably a straight or branched alkyl group having 1 to 3 carbon atoms which may be substituted by one or more fluorine atoms. Preferably, $Rf^1$ is straight. Preferably, the alkyl group which may be substituted by one or more fluorine atoms is a fluoroalkyl group in which a terminal carbon atom is $CF_2H$—, and the other carbon atoms are fully substituted by fluorine or a perfluoroalkyl group, more preferably a perfluoroalkyl group, specifically —$CF_3$, —$CF_2CF_3$ or —$CF_2CF_2CF_3$.

In the formulae (b1-1-i) and (b1-1-ii), $R^1$ is each independently a group represented by the following formula:

$$\text{—}(Y)_f\text{—}(CF_2)_g\text{—}(CH_2)_h\text{—}.$$

In this formula, Y is a divalent polar group. Examples of the divalent polar group include, but are not limited to, —COO—, —OCO—, —CONH—, —OCH$_2$CH(OH)CH$_2$—, —CH$_2$CH(OH)CH$_2$O—, —COS—, —SCO—, and —O—, preferably —COO—, —CONH—, —CH$_2$CH(OH)CH$_2$O—, or —O—. Further, in this formula, f, g and h are each independently an integer of 0 to 50, preferably 0 to 20, for example an integer of 1 to 20. The sum of f, g, and h is at least 1, preferably 1 to 10. Further preferably, f, g, and h are an integer of 0 to 2, yet preferably f is 0 or 1, g is 2, and h is 0 or 1. The occurrence order of the respective repeating units in parentheses with the subscript f, g, or h is not limited in the formula.

In a preferable embodiment, the compound (b1-1) is a compound of the formula (b1-1-i).

$$Rf^1\text{—PFPE-}R^1\text{—CH}_2\text{OH} \quad (b1\text{-}1\text{-}i)$$

[(b1-2) Monomer Containing Active Hydrogen and Carbon-Carbon Double Bond]

The component (b1-2) having an active hydrogen and a carbon-carbon double bond is preferably a (meth)acrylate ester or vinyl monomer having active hydrogen, particularly a hydroxyl group. Specific examples of the component (b1-2) include $$HO(CH_2CH_2)_iOCO(R^{12})C=CH_2$$

(wherein $R^{12}$ is a hydrogen atom, a chlorine atom, a fluorine atom or an alkyl group having 1 to 10 carbon atoms which may be substituted by fluorine, i=1 to 10), for example, 2-hydroxyethyl (meth)acrylate, 4-hydroxybutyl (meth)acrylate;

$$CH_3CH(OH)CH_2OCO(R^{12})C=CH_2$$

(wherein $R^{12}$ is a hydrogen atom, a chlorine atom, a fluorine atom, or an alkyl group having 1 to 10 carbon atoms which may be substituted by fluorine), for example, 2-hydroxypropyl (meth)acrylate;

$$CH_3CH_2CH(OH)CH_2OCO(R^{12})C=CH_2$$

(wherein $R^{12}$ is a hydrogen atom, a chlorine atom, a fluorine atom, or an alkyl group having 1 to 10 carbon atoms which may be substituted by fluorine), for example, 2-hydroxybutyl (meth)acrylate;

(wherein $R^{12}$ is a hydrogen atom, a chlorine atom, a fluorine atom, or an alkyl group having 1 to 10 carbon atoms which may be substituted by fluorine), for example, 2-hydroxy-3-phenoxypropyl (meth)acrylate;

(wherein $R^{12}$ is a hydrogen atom, a chlorine atom, a fluorine atom, or an alkyl group having 1 to 10 carbon atoms which may be substituted by fluorine), for example, pentaerythritol triacrylate;

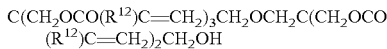

(wherein $R^{12}$ is a hydrogen atom, a chlorine atom, a fluorine atom, or an alkyl group having 1 to 10 carbon atoms which may be substituted by fluorine), for example, dipentaerythritol polyacrylate;

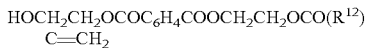

(wherein $R^{12}$ is a hydrogen atom, a chlorine atom, a fluorine atom, or an alkyl group having 1 to 10 carbon atoms which may be substituted by fluorine), for example, 2-acryloyloxyethyl-2-hydroxyethylphthalic acid;

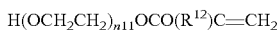

(wherein n11 is 1 to 30, $R^{12}$ is a hydrogen atom, a chlorine atom, a fluorine atom, or an alkyl group having 1 to 10 carbon atoms which may be substituted by fluorine), for example, poly(ethylene glycol) acrylate;

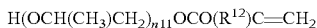

(wherein n11 is 1 to 30, $R^{12}$ is a hydrogen atom, a chlorine atom, a fluorine atom, or an alkyl group having 1 to 10 carbon atoms which may be substituted by fluorine), for example, poly(propylene glycol) acrylate

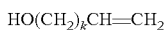

(k=1 to 20);

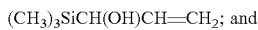

styrylphenol.

[(b1-3) Another Compound Having Active Hydrogen]

Another compound (b1-3) having an active hydrogen is preferably a compound which has neither a perfluoropolyether group nor a carbon-carbon double bond and which has at least one active hydrogen. The compound (b1-3) may be a compound having one active hydrogen-containing group, for example, a hydroxyl group, at one terminal of the molecular chain or having one active hydrogen-containing group, for example, a hydroxyl group, at each of two terminals of the molecular chain. Preferable examples of the compound (b1-3) include a monohydric alcohol comprising a straight or branched hydrocarbon having 1 to 16 carbon atoms, a secondary amine comprising a straight or branched hydrocarbon having 1 to 16 carbon atoms, a secondary amine containing an aromatic group, an Rf alcohol; $Q(CF_2)_l(CH=CH)_m(CHI)_n(CH_2)_oOH$ (wherein Q is a hydrogen atom, a fluorine atom or a $(CF_3)_2CF-$ group, l is an integer of 1 to 10, m and n are each independently 0 or 1, and o is an integer of 1 to 10), a polyalkylene glycol monoester; for example, $R^3(OCH_2CH_2)_pOH$, $R^3(OCH_2CH_2CH_2)_qOH$ ($R^3$ is a straight or branched hydrocarbon, an acetyl group, or an alkylphenoxy group having 1 to 16 carbon atoms, and p and q are each independently an integer of 1 to 20), an aromatic alcohol, and a silane compound having an active hydrogen.

Specific examples of the silane compound having an active hydrogen include $(CH_3)_3Si(CH_2)_{s1}OH$ (s1 is an integer of 1 to 20) and a compound having the structure shown below.

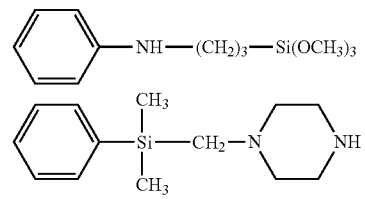

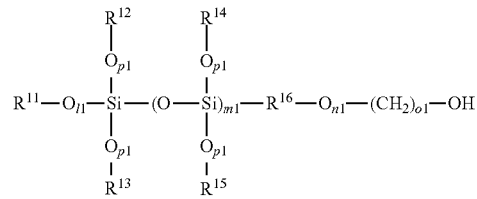

(b1-3-i)

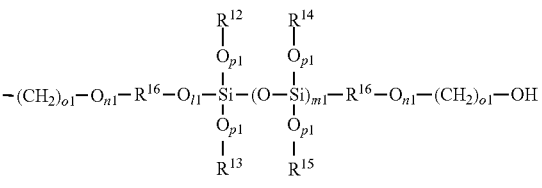

(b1-3-ii)

The silane compound having an active hydrogen in the compound (b1-3) may have, but not limited to, a number average molecular weight of 100 to 20,000, preferably 500 to 15,000, more preferably 800 to 12,000.

In the formulae (b1-3-i) and (b1-3-ii), $R^{11}$, $R^{12}$, $R^{13}$, $R^{14}$, and $R^{15}$ are each independently an alkyl group or an aryl group.

Examples of the alkyl group include, but are not limited to, an alkyl group having 1 to 10 carbon atoms, and a cycloalkyl group having 3 to 20 carbon atoms, preferably an alkyl group having 1 to 6 carbon atoms. The alkyl group may be straight or branched, preferably straight. A preferable specific example is, for $R^{11}$, an n-butyl group, and for $R^{12}$ to $R^{15}$, a methyl group.

Examples of the aryl group include, but are not limited to, an aryl group having 6 to 20 carbon atoms. The aryl group may contain two or more rings. Preferable aryl group is a phenyl group.

The alkyl group and the aryl group may optionally contain a heteroatom, for example, a nitrogen atom, an oxygen atom, or a sulfur atom in its molecular chain or ring.

Furthermore, the alkyl group and the aryl group may be optionally substituted by one or more substituents selected from a halogen; a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, which may be substituted by one or more halogens.

In the formulae (b1-3-i) and (b1-3-ii), $R^{16}$ represents a divalent organic group. Preferably, $R^{16}$ is $-(CH_2)_r-$ (in the formula, r is an integer of 1 to 20, preferably an integer of 1 to 10).

In the formulae (b1-3-i) and (b1-3-ii), l1 and n1 are each independently 0 or 1; m1 is an integer of 1 to 500, preferably an integer of 1 to 200, more preferably 5 to 150; o1 is an integer of 0 to 20, for example, an integer of 1 to 20, and p1 is 0 or 1.

Specific examples of the compound of the formula (b1-3-i) include the following compound.

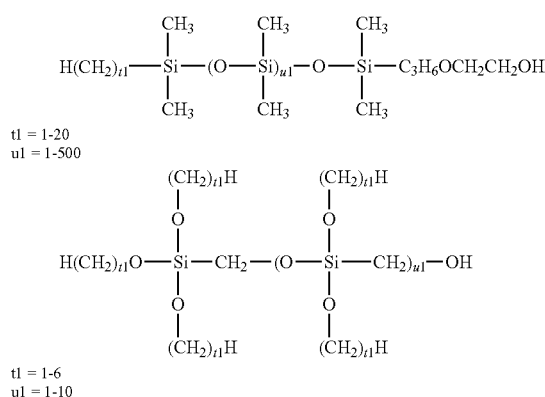

t1 = 1-20
u1 = 1-500 t1 = 1-6
u1 = 1-10

The compound (b1-3) may be a silane compound having an amino group as an active hydrogen-containing group. Examples of such compound include, but are not limited to, a compound of the following formula. Here, m is 1 to 500.

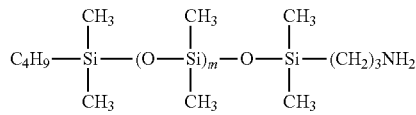

The compounds (b1-1), (b1-2) and (b1-3) may be in a range of 0.1 to 2 moles, 5 to 8.85 moles, and 0.05 to 2 moles, respectively, with respect to 9 moles of the isocyanate group in the component (A).

In one embodiment, the component (A) preferably includes a structure in which $-NHC(=O)-$ which is the moiety derived from the isocyanate group of the compound (a1) is bonded to a moiety that the active hydrogen is removed from of the compound (b1). More preferably, the component (A) includes $R_{x1}-C(=O)NH-$ structure and $R_{x2}-C(=O)NH$-structure. Here, $C(=O)$ represents a carbonyl group. For example, $R_{x1}$ is $Rf^1-PFPE-R^1-CH_2O-$ or $HOCH_2-R^1$-PFPE-$R^1-CH_2O-$, and $R_{x2}$ has any of the structures represented by the following formulae:

$CH_2=C(R^{12})COO(CH_2CH_2)_iO-$, $CH_2=C(R^{12})COOCH_2CH(CH_3)O-$, $CH_2=C(R^{12})COOCH_2CH(CH_2CH_3)O-$, $CH_2=C(R^{12})COOCH_2CH(CH_2OC_6H_5)O-$, $(CH_2=C(R^{12})COOCH_2)_3CCH_2O-$, $C(CH_2COO(R^{12})C=CH_2)_3CH_2OCH_2C(CH_2OCO(R^{12})C=CH_2)_2CH_2O-$, $CH_2=C(R^{12})COOCH_2CH_2OCOC_6H_4COOCH_2CH_2O-$, $CH_2=C(R^{12})COO(CH_2CH_2O)_{n11}-$, $CH_2=C(R^{12})COO(CH_2CH(CH_3)(CHO))_{n11}-$, $CH_2=CH(CH_2)_kO-$, $CH_2=CHCH(Si(CH_3)_3)O-$, and Ar-Ph-O—. Here, Ph is a benzene ring in which hydrogen atoms may be partially substituted, and Ar has a structure having at least a styryl group. $R^1$, $R^{12}$, $Rf^1$, n11, i, k, and PFPE are as described above.

Examples of a specific structure of the component (A) of this embodiment include, but are not limited to, the structure shown below.

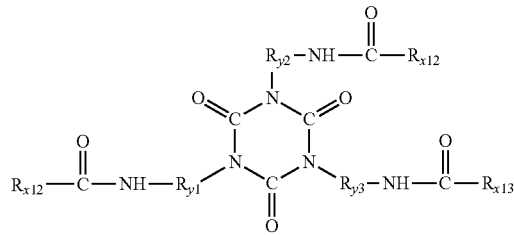

wherein $R_{x11}$, $R_{x12}$ and $R_{x13}$ are each independently $R_{x1}$, $R_{x2}$ or $R_{x3}$, at least one of $R_{x11}$, $R_{x12}$ and $R_{x13}$ is $R_{x1}$, and at least one of $R_{x11}$, $R_{x12}$, and $R_{x13}$ is $R_{x2}$. $R_{y1}$, $R_{y2}$ and Ry3 are each independently an alkylene group having 1 to 10 carbon atoms, preferably $-(CH_2)_{n5}-$ (in the formula, n5 is an integer of 1 to 10, preferably an integer of 3 to 6, representatively 6) or the structure shown below. Here, * denotes a bond. $R_{x1}$ and $R_{x2}$ are as defined above. $R_{xa}$ is a structure in which the active hydrogen of the compound (b1-3) is removed.

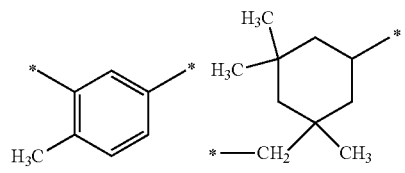

A method of the reaction of the compound (a1) with the compounds (b1-1) to (b1-3) is not limited. For example, the reaction may be performed in one system (i.e., one-pot synthesis), or the respective reaction may be performed in each of two systems.

When the one-pot synthesis is performed, for example, by adding the compounds (b1-1) to (b1-3) into the compound (a1) simultaneously, they may be simultaneously caused to react; or by sequentially adding the compounds (b1-1) to (b1-3), they may be sequentially caused to react. When they are sequentially added (caused to react), the order of adding (reacting) is not limited. For example, the compounds (b1-1) to (b1-3) may be separately added and caused to react in any order, or two components of the compounds (b1-1) to (b1-3) may be simultaneously added and caused to react, and then the other component may be added and caused to react.

Preferably, the compounds (b1-1) and (b1-2) may be added and caused to react, and then the compound (b1-3) may be added and caused to react, or the compound (b1-1) may be added and caused to react, and then the component (b1-2) may be added and caused to react, and finally, the compound (b1-3) may be added and caused to react. When they are sequentially added, the component added finally may be used in an excessive amount.

A solvent used in this reaction is not limited as long as the reaction can proceed. Various fluorine solvents, various general-purpose solvents, or a mixture thereof at any ratio can be used. In particular, from the viewpoint of solubility and the like, 1,1-dichloro-1,2,2,3,3-pentafluoropropane (HCFC 225), ZEORORA H (manufactured by Zeon Corporation), or (3,3,4,4,5,5,6,6,6-nonafluorohexyl)-2-chloroacrylate is preferably used.

In the reaction of the compound (a1) with the compounds (b1-1) to (b1-3), a catalyst is generally used, and as the catalyst, a catalyst containing a metal atom is preferably used. Examples of the metal atom include a tin atom, a titanium atom, a zirconium atom, a zinc atom, a platinum atom, a rhodium atom, a ruthenium atom, an iridium atom, a palladium atom, and the like. For example, a compound containing a tin atom, a compound containing a titanium atom, or a compound containing a zirconium atom or a zinc atom is used. Examples of the compound containing a tin atom include dibutyltin dilaurate, dibutyltin dioctoate, tin octanoate, dioctyl tin diacetate, dioctyl tin dilaurate, and dioctyl tin dioctate. Examples of the compound containing a titanium atom include titanic acid esters such as tetraisopropoxytitanium, tetra-n-butoxytitanium, tetrakis(2-ethylhexoxy)titanium, dipropoxybis(acetylacetonato)titanium and titanium isopropoxyoctylene glycol, or titanium chelate compounds. Examples of the compound containing a zirconium atom include zirconium tetraacetylacetonate, zirconium tributoxy monoacetylacetonate, zirconium monobutoxy acetylacetonate bis(ethylacetoacetate), zirconium dibutoxy bis(ethylacetoacetate), zirconium tetraacetylacetonate, and zirconium chelate compounds. Examples of the compound containing a zinc atom include zinc octylate.

[(A2) Compound Further Having Cyclic Siloxane Structure]

Examples of a compound further having a cyclic siloxane structure include the structure represented by the formula (2-1). A description of ranges overlapping the contents described above may be omitted.

$$X^{21}-[Z^{21}-Rf^{21}-Z^{21}-X^{22}]_{v2}-Z^{21}-Rf^{21}-Z^{21}-X^{21} \quad (2-1)$$

wherein $Rf^{21}$ is a divalent perfluoropolyether group with a molecular weight of 500 to 30000, optionally having a branched structure, and $X^{21}$ is, independently of each other, represented by the following formula (2-2). $Rf^{21}$ preferably has 1 to 500 repeating units represented by $-(CF_2)_{i2}O-$, wherein i2 is, independently of each other among the units, an integer of 1 to 6. $Rf^{21}$ is more preferably selected from the groups represented by the following formulae (2-6) to (2-8).

(2-2)

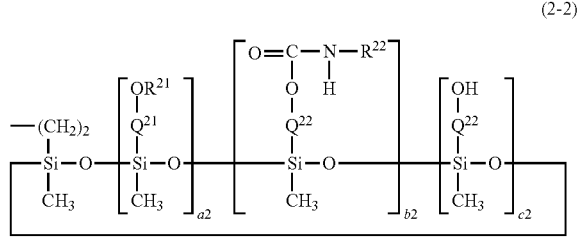

wherein, a2 and c2 are, independently of each other, an integer of 0 to 4 and b2 is an integer of 1 to 4, provided that the sum of a2+b2+c2 is 2, 3, or 4, $R^{21}$ is, independently of each other, represented by the following formula (2-3).

$$-(C_4H_8O)_{d2}(C_3H_6O)_{e2}(C_2H_4O)_{f2}(CH_2O)_{g2}R^{23} \quad (2-3)$$

In the formula (2-3), d2, e2, f2 and g2 are each independently an integer of 0 to 20 in a range where the molecular weight of $R^{21}$ is 30 to 600, and the repeating units may be sequenced at random. $R^{23}$ is a saturated or unsaturated hydrocarbon group having 1 to 10 carbon atoms. More preferably, $R^{21}$ is $-(C_2H_4O)_{p2}(C_3H_6O)_{q2}CH_3$ (p2 and q2 are an integer of 0 to 20, p2+q2 is 1 to 40, the propylene group may be branched, and the repeating units may be bonded randomly).

$R^{22}$ is an acryl group or an α-substituted acryl group-containing group represented by the following formula (2-4). In the formula (2-4), $R^{24}$ is, independently of each other, a hydrogen atom, a fluorine atom, a methyl group, or a trifluoromethyl group, $R^{25}$ is a divalent or trivalent linking group which may contain an ether bond and/or an ester bond having 1 to 18 carbon atoms, and n21 is an integer of 1 or 2.

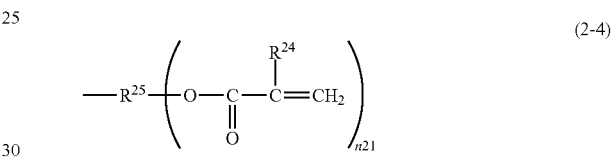

$R^{22}$ is more preferably one of the following groups.

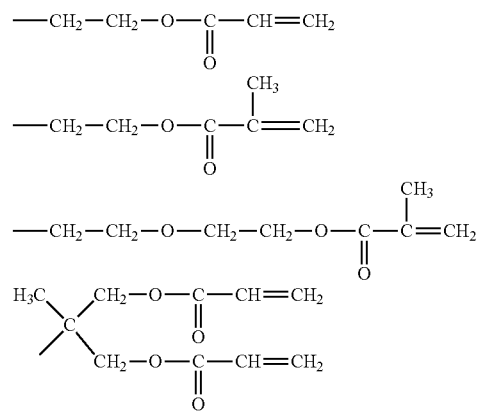

$Q^{21}$ and $Q^{22}$ are each independently a divalent linking group, which may contain an ether bond, an ester bond, an amide bond, or a urethane bond having 3 to 20 carbon atoms, may have a cyclic structure or a branched structure, and may be identical to or different from each other.

$X^{22}$ is, independently of each other, a group represented by the following formula (2-5). In the formula (2-5), $R^{21}$, $R^{22}$, $Q^{21}$ and $Q^{22}$ are as defined above, h2, i2, j2 are an integer of 0 to 3, h2+i2+j2 is any of 1 to 3, and the repeating units may be sequenced at random. $Q^{21}$ is preferably one of $-CH_2CH_2CH_2-$, $-CH_2CH_2CH_2-O-CH_2CH_2-$, $-CH_2CH_2CH_2-O-CH_2CH_2-O-CH_2CH_2-$, $-CH_2CH_2CH_2-O-CH_2CH_2-O-CH_2CH_2-O-CH_2CH_2-$, $-CH_2CH_2CH_2-O-CH_2CH_2-O-CH_2CH_2-O-CH_2CH_2-O-CH_2CH_2-$, and (2-9) groups.

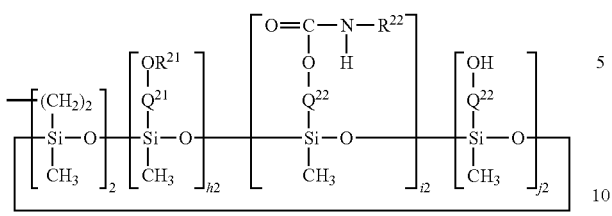

(2-5)

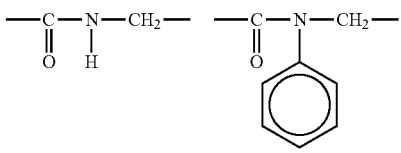

$$—CF(OCF_2CF)_{m2}O((CF_2)_{r2}O)_{s2}(CFCF_2O)_{n2}CF—$$
with $Y_2$ substituents (2-6)

$$—(CF_2)_{j2}(OCF_2CF_2CF_2)_{k2}O(CF_2)_{j2}—$$

(2-7)

$$—(CF_2)_{j2}(OCF_2CF)_{m2}(OCF_2)_{n2}O(CF_2)_{j2}—$$
with $Y_2$ substituent (2-8)

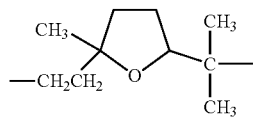

(2-9)

In the formulae (2-6) to (2-8), $Y_2$ is, independently of each other, a F or $CF_3$ group, r2 is an integer of 2 to 6, m2 and n2 are each an integer of 0 to 200, provided that m2+n2 is 2 to 200. s2 is an integer of 0 to 6, and the repeating units may be bonded randomly. j2 is an integer of 1 to 3, and k2 is an integer of 1 to 200. The repeating units may be bonded randomly.

$Z^{21}$ is a divalent organic group and may contain an oxygen atom, a nitrogen atom, and a fluorine atom, or may be a group having a cyclic structure or an unsaturated bond, and v2 is an integer of 0 to 5. $Z^{21}$ is more preferably one of the following groups.

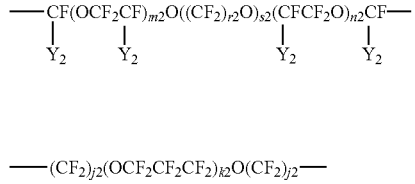

Examples of the catalyst used in the reaction include an alkyltin ester compound such as dibutyltin diacetate, dibutyltin dilaurate, dibutyltin dioctoate, dioctyltin diacetate, dioctyltin dilaurate, dioctyltin dioctoate and stannous dioctanoate; a titanate ester or titanium chelate compound, such as titanium tetraisopropoxide, titanium tetra-n-butoxide, titanium tetrakis(2-ethylhexoxide), titanium dipropoxybis(acetylacetonato) and titanium isopropoxyoctylene glycol; and zirconium tetraacetylacetonate, zirconium tributoxymonoacetylacetonate, zirconium monobutoxyacetylacetonate bis(ethylacetoacetate), zirconium dibutoxybis(ethylacetoacetate), zirconium tetraacetylacetonate, a zirconium chelate compound, and the like. These catalysts may be used alone or in admixture of two or more.

The reaction is carried out by diluting with a solvent. As examples of the solvent, any solvent may be used as long as it does not react with isocyanate and a hydroxyl group. Specific examples include ethers such as tetrahydrofuran, diisopropyl ether and dibutyl ether.

[(A3) Compound Further Having Polyether-Modified Polysiloxane Structure]

Examples of the polyether-modified polysiloxane structure include a perfluoropolyether group-containing polyether-modified polysiloxane represented by the following formula (3-1), and a perfluoropolyether group-containing polyether-modified polysiloxane represented by the following formula (3-2) is preferable.

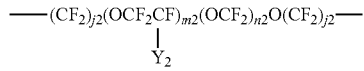

(3-1)

In the formula (3-1), $Rf^3$ is a straight or branched perfluoroalkyl group having 1 to 10 carbon atoms, $X^3$ is a fluorine atom or a trifluoromethyl group, $Q^3$ is a divalent organic group having 1 to 12 carbon atoms, $R^3$ is a hydrogen atom or an alkyl group or an acyl group having 1 to 6 carbon atoms, $R^{31}$ and $R^{32}$ are each independently an alkyl group, an aryl group or an aralkyl group having 1 to 10 carbon atoms, a3, b3, c3, and d3 are each independently an integer of 0 to 200, provided that a3+b3+c3+d3 is 1 or more, e3 is 0 or 1, p3 and q3 are each independently an integer of 0 to 50, provided that p3+q3 is 2 or more, and k3 is an integer of 1 to 3.

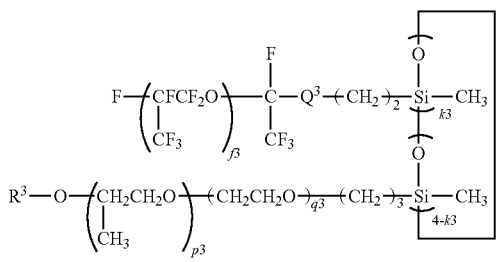

(3-2)

In the formula (3-2), $Q^3$, $R^3$, p3, q3, p3+q3, and k3 are the same as defined above. f3 is an integer 2 to 200.

In the compound formation reaction, a catalyst containing a metal atom is used, and examples thereof include a platinum-based catalyst and rhodium, ruthenium, iridium, and palladium-based compound. Specifically, it is possible to use $RhCl(PPh_3)_3$, $RhCl(CO)(PPh_3)_2$, $Ru_3(CO)_{12}$, $IrCl(CO)(PPh_3)_2$, $Pd(PPh_3)_4$ and the like (wherein Ph is a phenyl group).

The compound formation reaction is carried out in the presence of a solvent, and specific examples of the solvent include an aliphatic hydrocarbon compound such as n-hexane, n-heptane, isooctane, and isododecane; an aromatic hydrocarbon compound such as toluene and xylene; a fluorine-containing aromatic hydrocarbon compound such as trifluorotoluene and hexafluorometaxylene; a hydrofluoroether compound such as perfluorobutylmethyl ether, perfluorobutylethyl ether, and 1,1,1,2,2,3,4,5,5,5,5-decafluoro-3-methoxy-4-(trifluoromethyl)pentane; chlorofluorocarbon compounds such as difuroyl (manufactured by Daikin Industries, Ltd.); and a perfluoropolyether compound such as FOMBLIN and GALDEN (manufactured by Solvay Solexis), DEMNUM (manufactured by Daikin Industries, Ltd.), and Krytox (manufactured by DuPont).

[(A4) Fluorine-Containing Acrylate Compound]

Examples of the fluorine-containing acrylate compound include a fluorine-containing acrylate compound represented by the following general formula (4-1).

In the formula (4-1), $Rf^4$ is a monovalent or divalent perfluoropolyether group having a molecular weight of 400 to 20,000 and composed of a perfluoroalkyl group having 1 to 3 carbon atoms and an oxygen atom, $Q^{41}$ is a a4+1-valent linking group containing a4+1 or more silicon atoms, and $Z^{41}$ is a divalent hydrocarbon group, having 1 to 20 carbon atoms and optionally containing an oxygen atom, a nitrogen atom, and a silicon atom, and may include a cyclic structure. $Z^{42}$ is a divalent hydrocarbon group having 1 to 30 carbon atoms and optionally containing an oxygen atom and a nitrogen atom, and may include a cyclic structure. $Z^{43}$ is a b4+1-valent hydrocarbon group having 1 to 20 carbon atoms and optionally containing an oxygen atom and a nitrogen atom, and may include a cyclic structure. $R^{41}$ is a hydrogen atom or a hydrocarbon group having 1 to 6 carbon atoms and may include a cyclic structure, $R^{42}$ and $R^{43}$ are each a hydrogen atom or a fluorine atom, and $R^{44}$ is a hydrogen atom, a fluorine atom, or a hydrocarbon group having 1 to 6 carbon atoms and may include a cyclic structure. a4 is an integer of 1 to 10, b4 is an integer of 1 to 5, and c4 is 1 or 2.

In the urethane bond formation reaction of the formula (4-1), a suitable catalyst is generally added to increase the rate of the reaction. Examples of the catalyst include an alkyltin ester compound such as dibutyltin diacetate, dibutyltin dilaurate, dibutyltin dioctoate, dioctyltin diacetate, dioctyltin dilaurate, dioctyltin dioctoate and stannous dioctanoate; a titanate ester or titanium chelate compound, such as titanium tetraisopropoxide, titanium tetra-n-butoxide, titanium tetrakis(2-ethylhexoxide), titanium dipropoxybis(acetylacetonato) and titanium isopropoxyoctylene glycol; and zirconium tetraacetylacetonate, zirconium tributoxymonoacetylacetonate, zirconium monobutoxyacetylacetonate bis(ethylacetoacetate), zirconium dibotoxybis(ethylacetoacetate), zirconium tetraacetylacetonate, a zirconium chelate compound, and the like. These catalysts may be used alone or in admixture of two or more. The catalyst is used in an amount of 0.01 to 2% by mass, preferably 0.05 to 1% by mass, relative to a total mass of reactants to accelerate a reaction rate.

The above-mentioned reaction is carried out under dilution with a suitable solvent, and any solvent may be used as long as it does not react with an isocyanate group and a hydroxyl group. Specific examples include ethers such as tetrahydrofuran, diisopropyl ether and dibutyl ether and ketones such as acetone, methyl ethyl ketone, methyl butyl ketone, methyl isobutyl ketone, and cyclohexanone.

[(A5) Reaction Product Using Compound Having Poly (Perfluoroalkylene Ether) Chain and Styryl Groups at Both Ends of Poly(Perfluoroalkylene Ether) Chain]

The reaction product is produced by causing a reaction between a polymer (A5-P) and a compound (A5-c); the polymer (A5-P) being prepared by copolymerization in which essential monomer components are a compound (A5-a) having a poly(perfluoroalkylene ether) chain and

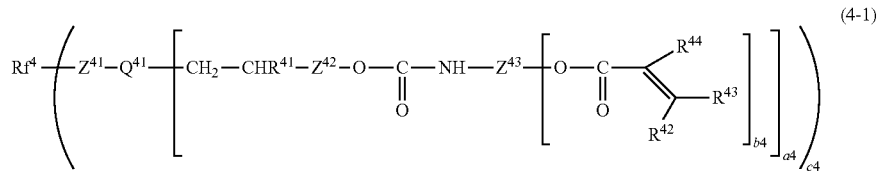

(4-1)

styryl groups at both ends of the poly(perfluoroalkylene ether) chain and a polymerizable unsaturated monomer (A5-b) having at least one functional group (A5-bf) selected from the group consisting of a hydroxyl group, an isocyanate group, an epoxy group, a carboxyl group, an acid anhydride group, and a carboxylic acid halide group; the compound (A5-c) having a polymerizable unsaturated group and at least one functional group (A5-cf) that has reactivity with the functional group (A5-bf) and is selected from the group consisting of a hydroxyl group, an isocyanate group, an epoxy group, a carboxyl group, an acid anhydride group, and a carboxylic acid halide group.

The compound (A5-a) can be obtained by, for example, causing a compound (A5-a2) having a poly(perfluoroalkylene ether) chain and a hydroxyl group at both ends of the chain to react with a styrene (A5-a3) having a functional group having reactivity with a hydroxyl group such as an alkyl halide group or an isocyanate group. Examples of the compound (A5-a2) include the following general formulae (A5-a2-i) and (A5-a2-ii).

HO—CH$_2$—PFPE-CH$_2$—OH     (A5-a2-i)

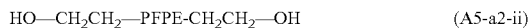

HO—CH$_2$CH$_2$—PFPE-CH$_2$CH$_2$—OH     (A5-a2-ii)

The halogen atom of the alkyl halide group of the styrene (A5-a3) may be a chlorine atom, a bromine atom, or an iodine atom. The alkyl group preferably has 1 to 6 carbon atoms and may be straight or branched. Of such alkyl halide groups, a chloromethyl group is preferred in view of reactivity with the compound (A5-a2) and ease of availability.

The styrene (A5-a3) may have, on the aromatic ring, a substituent other than the vinyl group and the functional group having reactivity with a hydroxyl group such as an alkyl halide group or an isocyanate group. The positional relationship between the vinyl group and the functional group having reactivity with the hydroxyl group such as an alkyl halide group or an isocyanate group may be any one of the ortho position, the meta position, and the para position; however, the para position is preferred because high polymerization properties are provided in the production of the polymer (A5-P).

Specific examples of the compound (A5-a) include the following general formulae (A5-a-i) to (A5-a-iv) and the like. The compound (A5-a) may be constituted by a combination of two or more compounds that have differences in the length of the poly(perfluoroalkylene ether) chain or the type of the divalent organic group connecting the poly(perfluoroalkylene ether) chain and a styryl group.

The polymerizable unsaturated monomer (A5-b) has the reactive functional group (A5-bf). The reactive functional group (A5-bf) is at least one selected from the group consisting of a hydroxyl group, an isocyanate group, an epoxy group, a carboxyl group, an acid anhydride group, and a carboxylic acid halide group. The polymerizable unsaturated monomer (A5-b) having such the functional group (A5-bf) may be a single polymerizable unsaturated monomer (A5-b) having a functional group (A5-bf) of a single type or a combination of two or more polymerizable unsaturated monomers (A5-b) having different functional groups (A5-bf). The polymerizable unsaturated group of the monomer (A5-b) is preferably a radical polymerizable carbon-carbon unsaturated double bond: specifically, a vinyl group, a (meth)acryloyl group, a maleimide group, or the like; more preferably a (meth)acryloyl group because polymerization is easily achieved.

Specific examples of the polymerizable unsaturated monomer (A5-b) include an unsaturated monomer having a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth)acrylamide, glycerin mono(meth)acrylate, polyethylene glycol mono(meth)acrylate, polypropylene glycol mono(meth)acrylate, 2-hydroxy-3-phenoxypropyl (meth)acrylate, 2-(meth)acryloyloxyethyl-2-hydroxyethyl phthalate, and lactone-modified (meth)acrylate having a hydroxyl group at the terminal; an unsaturated monomer having an isocyanate group such as 2-(meth)acryloyloxyethyl isocyanate, 2-(2-(meth)acryloyloxyethoxy)ethyl isocyanate, and 1,1-bis((meth)acryloyloxymethyl)ethyl isocyanate; an unsaturated monomer having an epoxy group such as glycidyl (meth)acrylate and 4-hydroxybutyl (meth)acrylate glycidyl ether; an unsaturated monomer having a carboxyl group such as (meth)acrylic acid, 2-(meth)acryloyloxyethylsuccinic acid, 2-(meth)acryloyloxyethylphthalic acid, maleic acid, and itaconic acid; an unsaturated monomer having an acid anhydride group such as maleic anhydride and itaconic anhydride; and an unsaturated monomer having a carboxylic acid halide group such as (meth)acrylic acid chloride and (meth)acrylic acid bromide.

The polymer (A5-P) may be produced by a method in which the compound (A5-a), the monomer (A5-b), and optionally another polymerizable unsaturated monomer are copolymerized in an organic solvent in the presence of a

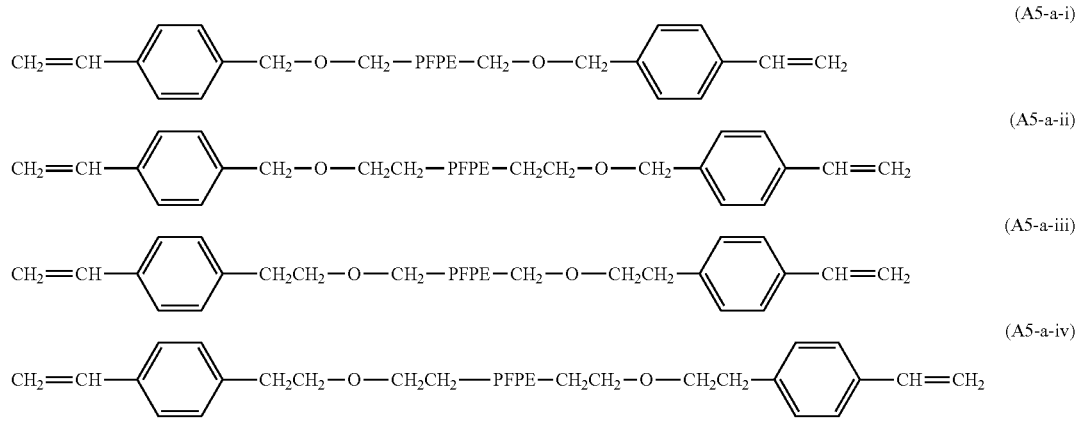

radical polymerization initiator. Preferred examples of the organic solvent used herein include ketones, esters, amides, sulfoxides, ethers, hydrocarbons, and fluorine-based solvents: specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, xylene, 1,3-bis(trifluoromethyl)benzene, and 1,4-bis(trifluoromethyl)benzene.

In the production of the polymer (A5-P), in addition to the compound (A5-a) and the monomer (A5-b), another polymerizable unsaturated monomer that is copolymerizable with the compound (A5-a) and the monomer (A5-b) may be used.

The polymer (A5-P) obtained as described above is made to react with the compound (A5-c) having a polymerizable unsaturated group and a functional group (A5-cf) that has reactivity with the functional group (A5-bf) to thereby provide a curable fluorine-containing resin.

The functional group (A5-cf) of the compound (A5-c) has reactivity with the functional group (A5-bf) and is at least one selected from the group consisting of a hydroxyl group, an isocyanate group, an epoxy group, a carboxyl group, and a carboxylic acid halide group. When the functional group (A5-bf) is a hydroxyl group, the functional group (A5-cf) may be an isocyanate group, an epoxy group, a carboxyl group, an acid anhydride group, or a carboxylic acid halide group. When the functional group (A5-bf) is an isocyanate group, the functional group (A5-cf) may be a hydroxyl group. When the functional group (A5-bf) is an epoxy group, the functional group (A5-cf) may be a hydroxyl group, a carboxyl group, or an acid anhydride group. When the functional group (A5-bf) is a carboxyl group, the functional group (A5-cf) may be a hydroxyl group or an epoxy group. When the functional group (A5-bf) is a carboxylic acid halide group, the functional group (A5-cf) may be a hydroxyl group. In such cases, a plurality of functional groups may be combined unless there may be a disadvantage for the reaction.

Specific examples of the compound (A5-c) include an unsaturated monomer having a hydroxyl group such as 2-hydroxyethyl (meth)acrylate, 2-hydroxypropyl (meth) acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth)acrylamide, glycerin mono(meth)acrylate, polyethylene glycol mono(meth)acrylate, polypropylene glycol mono (meth)acrylate, 2-hydroxy-3-phenoxypropyl (meth)acrylate, 2-(meth)acryloyloxyethyl-2-hydroxyethyl phthalate, and lactone-modified (meth)acrylate having ahydroxyl group at the terminal; an unsaturated monomer having an isocyanate group such as 2-(meth)acryloyloxyethyl isocyanate, 2-(2-(meth)acryloyloxyethoxy)ethyl isocyanate, and 1,1-bis ((meth)acryloyloxymethyl)ethyl isocyanate; an unsaturated monomer having an epoxy group such as glycidyl (meth) acrylate and 4-hydroxybutyl (meth)acrylate glycidyl ether; an unsaturated monomer having a carboxyl group such as (meth)acrylic acid, 2-(meth)acryloyloxyethylsuccinic acid, 2-(meth)acryloyloxyethylphthalic acid, maleic acid, and itaconic acid; an unsaturated monomer having an acid anhydride group such as maleic anhydride and itaconic anhydride; and an unsaturated monomer having a carboxylic acid halide group such as (meth)acrylic acid chloride and (meth)acrylic acid bromide. An unsaturated monomer having a hydroxyl group and a plurality of polymerizable unsaturated groups may be used such as 2-hydroxy-3-acryloyloxypropyl methacrylate, pentaerythritol triacrylate, or dipentaerythritol pentaacrylate.

The process of making the polymer (A5-P) react with the compound (A5-c) having a polymerizable unsaturated group and a functional group (A5-cf) that has reactivity with the functional group (A5-bf) may be performed under conditions such that the polymerizable unsaturated group in the compound (A5-c) is not polymerized.

The process of making the polymer (A5-P) react with the compound (A5-c) having a polymerizable unsaturated group and a functional group (A5-cf) that has reactivity with the functional group (A5-bf) may be performed under conditions such that the polymerizable unsaturated group in the compound (A5-c) is not polymerized, and, for example, the reaction is preferably caused under a temperature condition adjusted to be a range of 30° C. to 120° C. The reaction is preferably performed in the presence of a catalyst and a polymerization inhibitor, and, in the presence of an organic solvent.

For example, when the functional group (A5-bf) is a hydroxyl group and the functional group (A5-cf) is an isocyanate group, or when the functional group (A5-bf) is an isocyanate group and the functional group (A5-cf) is a hydroxyl group, a preferred process is performed such that a urethane-forming reaction catalyst is, for example, dibutyltin dilaurate, dibutyltin diacetate, tin octylate, or zinc octylate.

Preferred examples of the organic solvent used in the above-mentioned reaction include ketones, esters, amides, sulfoxides, ethers, hydrocarbons, and fluorine-based solvents: specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, xylene, 1,3-bis(trifluoromethyl)benzene, and 1,4-bis(trifluoromethyl)benzene. These organic solvents may be appropriately selected in consideration of the boiling point and compatibility.

The content of the component (A) is preferably in a range of 5 to 80% by mass, more preferably in a range of 10 to 60% by mass, particularly preferably in a range of 15 to 60% by mass relative to the total mass of the curable composition.

[(B) Curable Resin, Curable Monomer]

The curable resin may be a photocurable resin or a thermosetting resin and is not limited as long as the resin has heat resistance and strength depending on the purpose, and a photocurable resin, particularly an ultraviolet curable resin is preferable. (B) The curable resin and the curable monomer can be used in combination as necessary.

Examples of the curable resin include an acrylic-based polymer, a polycarbonate-based polymer, a polyester-based polymer, a polyamide-based polymer, a polyimide-based polymer, a polyethersulfone-based polymer, a cyclic polyolefin-based polymer, a fluorine-containing polyolefin-based polymer (PTFE, etc.), and a fluorine-containing cyclic non-crystalline-based polymer (CYTOP (registered trademark), Teflon (registered trademark) AF, etc.). These resins correspond to both thermosetting resins and photocurable resins. Since these curable resins have transparency to ultraviolet rays, they can also preferably be used in the case of being cured by being irradiated with ultraviolet light.

Specific examples of the curable resin or the curable monomer constituting the curable resin include an alkyl vinyl ether such as cyclohexylmethyl vinyl ether, isobutyl vinyl ether, cyclohexyl vinyl ether, and ethyl vinyl ether, glycidyl vinyl ether, vinyl acetate, vinyl pivalate, an acryloyl group-containing monomer, for example, (meth)acryloylmorpholine, various (meth)acrylates such as phenoxyethyl acrylate, benzyl acrylate, stearyl acrylate, lauryl acrylate, 2-ethylhexyl acrylate, allyl acrylate, 1,3-butanediol diacrylate, 1,4-butanediol diacrylate, 1,6-hexanediol diacrylate, trimethylol, propane triacrylate, pentaerythritol triacrylate, dipentaerythritol hexaacrylate, ethoxyethyl ate, methoxyethyl acrylate, glycidyl acrylate, tetrahydrofurfuryl acrylate, diethylene glycol diacrylate, neopentyl glycol diacrylate, polyoxyethylene glycol diacrylate, tripropylene glycol diacrylate, 2-hydroxyethyl acrylate, 2-hydroxypropyl acrylate, 4-hydroxybutyl vinyl ether, N,N-diethylaminoethyl acrylate, N,N-dimethylaminoethyl acrylate, N-vinylpyrrolidone, dimethylaminoethyl methacrylate, and silicone-based acrylate, maleic anhydride, vinylene carbonate, polyacrylates having linear side chain, polyacrylates having cyclic side chain, polynorbornene, polynorbornadiene, polycarbonate, polysulfone amide, and fluorine-containing cyclic non-crystalline polymers (CYTOP (registered trademark), and Teflon (registered trademark) AF, etc.). The curable resin can be used in a liquid state by being heated as necessary.

The curable monomer may be a photocurable monomer or a thermosetting monomer and is preferably a photocurable monomer, particularly an ultraviolet curable monomer.

Examples of the curable monomer include an acryloyl group-containing monomer, and, for example, (meth)acryloylmorpholine or a (meth)acrylate group-containing monomer can be used. Examples of (meth)acryloylmorpholine include 4-acryloylmorpholine. Examples of the (meth)acrylate group-containing monomer include urethane (meth) acrylate, epoxy(meth)acrylate, polyester (meth)acrylate, polyether (meth)acrylate, silicone (meth)acrylate, a (meth) acrylate monomer, and an alkoxysilane group-containing (meth)acrylate monomer.

Specific examples of urethane (meth)acrylate include poly [(meth) acryloyloxyalkyl] isocyanurate represented by tris (2-hydroxyethyl) isocyanurate diacrylate, and tris (2-hydroxyethyl) isocyanurate triacrylate.

Epoxy (meth)acrylate is one obtained by adding a (meth) acryloyl group(s) to an epoxy group(s), and common ones are those obtained by using bisphenol A, bisphenol F, phenol novolac, or an alicyclic compound as a starting material.

Examples of polyhydric alcohol constituting a polyester unit of polyester (meth) acrylate include ethylene glycol, 1,4-butanediol, 1,6-hexanediol, diethylene glycol, trimethylolpropane, dipropylene glycol, polyethylene glycol, polypropylene glycol, pentaerythritol, and dipentaerythritol, and examples of polybasic acid include phthalic acid, adipic acid, maleic acid, trimellitic acid, itaconic acid, succinic acid, terephthalic acid, and alkenyl succinic acid.

Examples of polyether (meth)acrylate include polyethylene glycol di(meth)acrylate, polypropylene glycol di(meth) acrylate, and polyethylene glycol-polypropylene glycol di(meth)acrylate.

Silicone (meth)acrylate is dimethyl polysiloxane having a molecular weight of 1,000 to 10,000 and being modified with a (meth)acryloyl group(s) at its one or both terminals, and examples thereof include the following compounds.

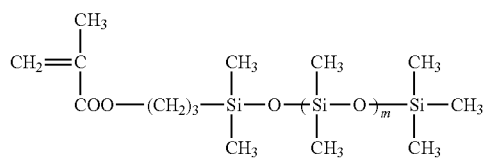

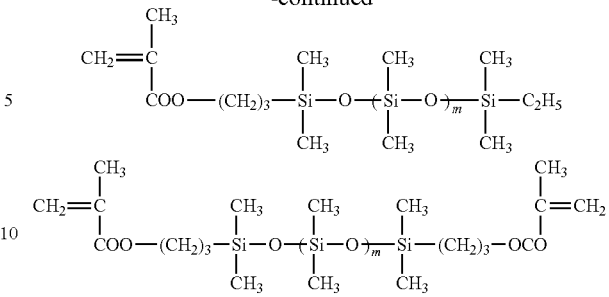

(Meth)acrylate monomer may be monofunctional or polyfunctional (meth)acrylate monomer, and examples thereof include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth) acrylate, t-butyl (meth)acrylate, n-pentyl (meth)acrylate, 3-methyl butyl (meth)acrylate, n-hexyl (meth)acrylate, 2-ethyl-n-hexyl (meth)acrylate, n-octyl (meth)acrylate, cyclohexyl (meth)acrylate, isobornyl (meth)acrylate, benzyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 5-hydroxypentyl (meth) acrylate, 6-hydroxyhexyl (meth)acrylate, 4-hydroxy-cyclohexyl (meth)acrylate, neopentyl glycol mono (meth)acrylate, (1,1-dimethyl-3-oxobutyl)(meth)acrylate, 2-acetoacetoxyethyl (meth)acrylate, 2-methoxyethyl (meth) acrylate, 2-ethoxyethyl (meth)acrylate, neopentyl glycol mono (meth)acrylate, glycerol mono (meth)acrylate, ethylene glycol diacrylate, propylene glycol diacrylate, 1,6-hexanediol diacrylate, 1,9-nonanediol diacrylate, 1,10-decanediol diacrylate, trimethylol propane triacrylate, pentaerythritol tetra-acrylate, and halogen atom-containing (meth)acrylate monomer. Examples of halogen atom-containing (meth)acrylate monomer include 3-chloro-2-hydroxypropyl (meth)acrylate, 2,2,3,3-tetrafluoropropyl acrylate, 2,2,3,3,4,4,5,5-octafluoropentyl acrylate, 3,3,4,4,5,5,6,6,7,7,8,8,8-tridecanfluorooctyl acrylate, (3,3,4,4,5,5,6,6,6-nonafluorohexyl)-2-chloroacrylate, and (3,3,4,4,5,5,6,6,7,7,8,8,8-tridecanfluorooctyl)-2-chloroacrylate. The halogen atom-containing (meth)acrylate monomer is preferably a fluorine atom-containing monomer, more preferably a monomer in which at least one fluorine atom-substituted alkyl group is bonded to a (meth)acryloyl group.

Examples of alkoxysilane group-containing (meth)acrylate monomer include 3-(meth)acryloyloxypropyl trichlorosilane, 3-(meth)acryloyloxypropyl trimethoxysilane, 3-(meth)acryloyloxypropyl triethoxysilane, 3-(meth)acryloyloxypropyl triisopropoxysilane, (also referred to as (tri-isopropoxysilyl) propyl methacrylate (abbreviation: TISMA) and (triisopropoxysilyl) propyl acrylate), 3-(meth) acryloxyisobutyl trichlorosilane, 3-(meth)acryloxyisobutyl triethoxysilane, 3-(meth)acryloxyisobutyl triisopropoxy 3-(meth)acryloxyisobutyl trimethoxysisilanelane.

Among the curable resin and curable monomer, preferred and commercially available ones include the following.

Examples of the curable resin include silicone resin PAK-01, PAK-02 (produced by Toyo Gosei Co., Ltd.), nanoimprint resin NIF series (produced by Asahi Glass Co., Ltd.), nanoimprint resin OCNL series (produced by Tokyo Ohka Kogyo Co., Ltd.), NIAC2310 (produced by Daicel Chemical Industries, Ltd.), epoxy acrylate resins EH-1001, ES-4004, EX-C101, EX-C106, EX-C300, EX-501, EX-0202, EX-0205, EX-5000, etc. (produced by Kyoeisha Chemical Co., Ltd.), hexamethylene diisocyanate-based polyisocyanates SUMIDUR N-75, SUMIDUR N3200, SUMIDUR HT, SUMIDUR N3300, and SUMIDUR N3500 (produced by Sumitomo Bayer Urethane Co., Ltd.).

Among the above-mentioned curable monomers, examples of silicone acrylate-based resin include SILAPLANE FM-0611, SILAPLANE FM-0621, SILAPLANE FM-0625; bi-terminal type (meth)acrylic SILAPLANE such as SILAPLANE FM-7711, SILAPLANE FM-7721 and SILAPLANE FM-7725 etc.; SILAPLANE FM-0411, SILAPLANE FM-0421, SILAPLANE FM-0428, SILAPLANE FM-DA11, SILAPLANE FM-DA21, SILAPLANE DA25; mono-terminal type (meth)acrylic SILAPLANE such as SILAPLANE FM-0711, SILAPLANE FM-0721, SILAPLANE FM-0725, SILAPLANE TM-0701 and SILAPLANE TM-0701T (produced by JCN Co., Ltd.). The term "(meth)acrylic" means methacrylic and/or acrylic.

Examples of polyfunctional acrylate include A-9300, A-9300-1CL, A-GLY-9E, A-GLY-20E, A-TMM-3, A-TMM-3L, A-TMM-3LM-N, A-TMPT, and A-TMMT (produced by Shin-Nakamura Chemical Co., Ltd.).

Examples of polyfunctional methacrylate include TMPT (produced by Shin-Nakamura Chemical Co., Ltd.).

The content of (B) the curable resin and/or the curable monomer is preferably in a range of 20 to 95% by mass, more preferably in a range of 40 to 90% by mass relative to the curable composition. The content is further preferably in a range of 40 to 85% by mass.

In a preferable embodiment, the component (A) contained in the curable composition of the present invention is dissolved in the component (B). When the component (A) is dissolved in the component (B), a more uniform surface-treating layer can be formed. Dissolution means, for example, a state in which no suspended matter is generated by visual observation.

[(C) Organic Solvent Having No Radical Reactive Group]

In the curable composition of the present invention, an organic solvent having no radical reactive group is not substantially contained (hereinafter sometimes referred to as the component (C)). The curable composition of the present invention has such characteristics, so that it hardly causes a decreasing in heat resistance, and a decreasing in strength, and it is in a lower clouded state, and the like due to a residual solvent contained in a surface-treating layer obtained after curing the curable composition.

Specific examples of the organic solvent having no radical reactive group include aliphatic hydrocarbon such as hexane, cyclohexane, heptane, octane, nonane, decane, undecane, dodecane and mineral spirit; aromatic hydrocarbon such as benzene, toluene, xylene, naphthalene, and solvent naphtha; ester such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketone such as acetone, methyl ethyl ketone, methyl isobutyl ketone, 2-hexanone, cyclohexanone, methyl amino ketone, and 2-heptanone; glycol ether such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohol such as methanol, ethanol, isopropanol, n-butanol, isobutanol, tert-butanol, sec-butanol, 3-pentanol, octyl alcohol, 3-methyl-3-methoxybutanol, and tert-amyl alcohol; cyclic ether such as tetrahydrofuran, tetrahydropyran, and dioxane; amide such as N, N-dimethylformamide and N, N-dimethylacetamide; ether alcohol such as methyl cellosolve, cellosolve, isopropyl cellosolve, butyl cellosolve, and diethylene glycol monomethyl ether; and fluorine-containing solvent such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane, Zeorora H, HFE-7100, HFE-7200, and HFE-7300. Alternatively, a mixed solvent of two or more thereof may be used.

The phrase "organic solvent is not substantially contained" means that the organic solvent is not contained at all, or an extremely small amount of the organic solvent may be contained. For example, the content of the organic solvent relative to 100% by mass of the curable composition, in the curable composition that the organic solvent is not substantially contained, is preferably 1% by mass or less, more preferably 1000 ppm by mass or less, further preferably 100 ppm by mass or less, and particularly preferably 0 ppm by mass. When organic solvent is not substantially contained as mentioned above, the surface-treating layer, which is formed after curing the curable resin of the present invention, is in a lower clouded state, and causes less peeling between the surface-treating layer and a base material. Furthermore, when organic solvent is not substantially contained, the amount of the organic solvent volatilized from the curable resin or from the formed surface-treating layer can be reduced, which can contribute to an improvement in working environment. Although the base material may shrink and deform when the organic solvent contained in the curable composition volatilizes, this deformation hardly occurs in the curable solvent of the present invention wherein organic solvent is not substantially contained.

It is preferable that organic solvent is not substantially contained respect to the component (A). The phrase "organic solvent is not substantially contained" means as described above.

The content of the above-mentioned organic solvent can be measured, for example, by gas chromatography.

[Viscosity]

In one embodiment, the viscosity of the curable composition of the present invention at 25° C. is preferably 5 to 100000 mPa·s, more preferably 10 to 10000 mPa·s, further preferably 10 to 1000 mPa·s. By having such a viscosity, a curable composition with good handling properties can be obtained. The viscosity of the curable composition can be measured, for example, using a vibration type viscometer SV-10 manufactured by A&D Company, Limited.

[Content of Metal Atoms Derived from Catalyst]

The curable composition of the present invention is preferably substantially free from metal atom derived from a catalyst. Examples of metal atom derived from a catalyst include a tin atom, a titanium atom, a zirconium atom, a zinc atom and a platinum atom. The phrase "substantially free from metal atom derived from a catalyst" means that tin atom, titanium atom or zirconium atom are not contained at all, or an extremely small amount of the metal atom derived from the catalyst may be contained. For example, the content of metal atom (for example, tin atom, titanium atom or zirconium atom) derived from a catalyst in the curable composition of the present invention which is substantially free from metal atom (for example, tin atom, titanium atom or zirconium atom) derived from a catalyst is preferably 100 ppm by mass or less, more preferably 10 ppm by mass or less, further preferably 1 ppm by mass or less, particularly preferably the detection limit or less, relative to 100% by mass of the curable composition. Since the curable composition of the present invention is substantially free from metal atoms derived from a catalyst, it is possible to prevent the clouded state of the surface-treating layer formed by using the curable composition of the present invention, and to suppress proceeding of the reaction in which metal atom derived from a catalyst in the surface-treating layer serve as a catalyst. In one embodiment, the curable composition of the present invention is substantially free from tin atom, titanium atom or zirconium atom.

It is preferable that metal atom derived from a catalyst is not substantially contained respective to the component (A). The phrase "not substantially contained" means as described above.

The content of tin atom, titanium atom or zirconium atom can be measured by the method described in the examples.

In addition to the above components, the curable composition of the present invention may contain another component such as an active energy curing initiator.

As the active energy curing initiator, for example, a compound is used which generates a radical, cation, or the like only by irradiation of an electromagnetic wave in the wavelength region of 380 nm or less, that is, an ultraviolet light, an electron beam, an X-ray, a γ-ray, etc., and functions as a catalyst initiating curing (cross-linking reaction) of a curable moiety (for example, a carbon-carbon double bond) in the compound of the composition, usually a compound which generates a radical or cation, in particular a radical by irradiation of ultraviolet.

The active energy curing initiator in the curable composition of the present invention can be appropriately selected depending on a type of the component (b1-2) having a carbon-carbon double bond, a type or irradiation intensity of an active energy ray used (range of wavelength, etc.). When a general active energy ray in an ultraviolet region is used, examples of the initiator include the following compounds.

Acetophenones
acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like.

Benzoins
benzoin, benzoin methyl ether, benzoin ethyl ether, benzoin isopropyl ether, benzoin isobutyl ether, benzyl dimethyl ketal, and the like.

Benzophenones
benzophenone, benzoyl benzoate, methyl benzoyl benzoate, 4-phenyl benzophenone, hydroxy benzophenone, hydroxypropyl benzophenone, acrylated benzophenone, Michler's ketone, and the like.

Thioxanthones
thioxanthone, chlorothioxanthone, methylthioxanthone, diethylthioxanthone, dimethylthioxanthone, and the like.

Others
benzyl, α-acyloxime ester, acylphosphine oxide, glyoxy ester, 3-ketocoumarin, 2-ethylanthraquinone, camphorquinone, anthraquinone, and the like.

These active energy curing initiator may be used alone or may be used in combination of two or more.

The active energy curing initiator is contained at 0.01 to 30 parts by mass, preferably 0.1 to 20 parts by mass with respect to the 100 parts by mass total of the composition obtained by reacting the compound (a1) with the compound (b1), but is not limited thereto.

In one embodiment, the curable composition of the present invention contributes to good releasability from a mold. Specifically, a cured film obtained by curing the composition containing the curable composition of the present invention can have good releasability from the mold. More specifically, when a cured film molded using a mold is formed on the surface of a base material, there is a tendency that the cured film formed is less likely to adhere to the mold and is less likely to peel from the surface of the base material. Even when silicon having an oxide film on its surface is used as the base material, for example, a cured film formed from the curable composition of this embodiment tends to be difficult to peel off from the surface of the base material.

In this embodiment, the component (B) preferably contains a halogen atom-containing curable resin and/or a halogen atom-containing curable monomer, and more preferably contains a halogen atom-containing photocurable resin and/or a halogen atom-containing photocurable monomer. When the component (B) contains such a resin and/or a monomer, releasability from the mold can be improved. Specific examples of the halogen atom-containing curable monomer include the above-mentioned halogen atom-containing (meth)acrylate monomer and a monomer having a structural unit derived from a fluorine-containing ethylenic monomer described below. In the following formulae, $Z^1$ is a functional group selected from the group consisting of —OH, —CH$_2$OH, —COOH, a carboxylic acid derivative, —SO$_3$H, a sulfonic acid derivative, an epoxy group and a cyano group.

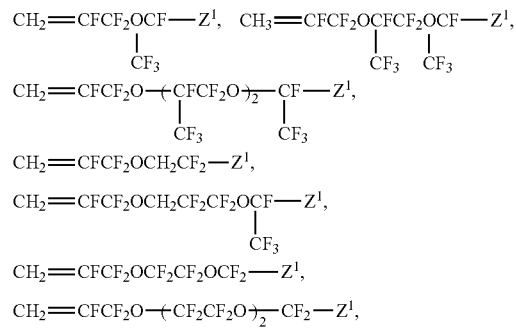

For example, the component (B) can contain a halogen atom-containing (meth)acrylate monomer. As the halogen atom-containing (meth)acrylate monomer, the above-mentioned monomers can be used, and it is preferable to use a monomer in which a hydrogen atom bonded to a carbon atom at an α-position is substituted with a halogen atom (for example, a fluorine atom, a chlorine atom, or a bromine atom). From the viewpoint of improving compatibility with the component (A) or from the viewpoint of increasing Tg of a cured film, the halogen atom bonded to the carbon atom at the α-position is preferably a chlorine atom. In this monomer, the number of carbon atoms of the alkyl group bonded to the (meth)acryloyl group is preferably in a range of 1 to 8, more preferably in a range of 3 to 8, particularly preferably in a range of 3 to 6, further preferably in a range of 4 to 6. It is preferable that at least one hydrogen atom of this alkyl group be substituted with a fluorine atom. The component (B) is preferably a halogen atom-containing photocurable resin and/or a halogen atom-containing photocurable monomer, more preferably a halogen atom-containing photocurable monomer, particularly preferably a halogen atom-containing (meth)acrylate monomer.

The "composition containing the curable composition of the present invention" described above may contain components other than the curable composition of the present invention, for example, silicone resins, resin compositions such as amorphous fluorine atom-containing resins, and initiators such as photoinitiators.

The material of the mold can be appropriately selected according to the purpose and necessity. For example, metals (for example, aluminum, nickel, iron, copper, and chromium), metal oxides (for example, alumina and zirconia), quartz, resins (for example, silicone, acryl, TAC, polycarbonate, polyimide, polyamide, cycloolefin, vinyl chloride, polyethylene, polyvinyl alcohol, and amorphous fluororesin) or composites thereof may be used.

Although the shape of the mold is not limited, one having a line and space pattern can be used, for example. It is possible to use a mold in which the ratio of the width and the depth of the pattern formed in the mold, that is, the aspect ratio is in a range of 0.1 to 50. For example, a mold having a pitch in the range of 100 μm to 100 nm can be used, more specifically, a mold having a pitch in the range of 100 μm to 2 nm can be used, and in particular, a mold having a pitch in the range of 100 μm to 1 nm can be used. The pattern width of the mold to be used may be in the range of 100 μm to 1 nm, for example. When the curable composition of this embodiment is used together with such a mold, a cured film having a surface having a fine concavity and convexity pattern can be formed.

(Method for Producing Curable Composition)

The method for producing a curable composition of the present invention includes removing (C) an organic solvent having no radical reactive group from a mixture containing a reactive composition, containing (A) a compound having a perfluoropolyether group and a curable moiety and (C) the organic solvent, and (B) a curable resin and/or a curable monomer (this method is hereinafter sometimes referred to as Production Method 1).

Alternatively, the method for producing a curable composition of the present invention includes mixing a reactive composition, containing (A) a compound having a perfluoropolyether group and a curable moiety and (C) an organic solvent having no radical reactive group, with a solvent, forming a precipitate containing the component (A), separating the formed precipitate, and mixing the separated precipitate with (B) a curable resin and/or a curable monomer (this method is hereinafter sometimes referred to as Production Method 2). (A), (B) and (C) are as described above.

[Production Method 1]

In a method for removing the organic solvent from the reaction composition, a known method can be used as a method for removing the organic solvent from the composition. For example, the organic solvent can be removed by heating. In the prior art, the organic solvent has been removed simply by heating the reaction composition. However, in this case, polymerization of the component (A) proceeds due to the heat, and gelation may occur. In contrast, in the method of the present embodiment in which the reaction composition is mixed with the curable resin and/or the curable monomer and the mixture is heated, gelation as described above hardly occurs.

In one embodiment, the boiling point of the curable resin and/or the curable monomer is preferably higher than the boiling point of the organic solvent.

The mixture can be heated at a temperature at which the organic solvent can volatilize. When the reaction composition is mixed with the curable monomer, it is preferable to carry out the mixing at a temperature at which polymerization of the curable monomer is difficult to proceed. It is preferable to carry out heating under reduced pressure if necessary.

In one embodiment, the curable composition produced by Production Method 1 may be further mixed with another curable resin and/or curable monomer. As such another curable resin and/or curable monomer, a curable resin and/or curable monomer having an arbitrary boiling point can be used.

[Production Method 2]

The solvent is a solvent in which the component (A) is substantially insoluble, and is preferably a poor solvent. When such a solvent is used, separation of the component (A) and removal of the organic solvent are facilitated. Examples of the solvent include alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; aliphatic hydrocarbons such as hexane, cyclohexane, heptane, octane, nonane, decane, undecane, dodecane, and mineral spirit; aromatic hydrocarbon such as benzene, toluene, xylene, naphthalene, and solvent naphtha; and glycol ether such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether. It is preferable to use a protic polar solvent from the viewpoint that it may not dissolve the component (A), and that the impurity contained such as a reaction solvent and a tin catalyst can be removed. Among the above-mentioned solvents, it is preferable to use alcohols from the viewpoint of easy handling at room temperature and easy separation from a precipitate.

A method for separating the precipitate is, but not limited to, for example, by filtration or removal of the upper phase. The precipitate containing the component (A) is preferably dissolved in the component (B).

Production Methods 1 and 2 for producing a curable composition of the present invention may further include forming the component (A). In this case, the reaction composition used in the method for producing a curable composition of the present invention may be a composition obtained as a result of synthesis of the component (A) in the component (C).

The component (A) can be formed by using a known technique. For example, the component (A) can be obtained by reacting (a1) the compound having an isocyanate group (—NCO group) and (b1) the compound having an active hydrogen. (a1) and (b1) are as described above.

(Film)

The film of the present invention is a film having a concavity and convexity structure on its surface, and in this film, pencil hardness on the surface is 2H or more, a water contact angle on the surface is 140° or more, and an n-hexadecane contact angle is 70° or more.

The film of the present invention can be formed using the curable composition of the present invention (hereinafter, the curable composition of the present invention and the composition containing the curable composition are also generally referred to as a "surface-treating agent"). That is, the film of the present invention may have a layer formed from the curable composition of the present invention. The curable composition of the present invention may be used as it is or may be mixed with other curable material.

The film of the present invention preferably has a layer formed using the surface-treating agent of the present invention. The film of the present invention may be composed of a layer formed using the surface-treating agent of the present invention or may have a layer formed using the surface-treating agent of the present invention and a base material for film.

In one embodiment, the film of the present invention may be consisted of a layer formed using the surface-treating agent of the present invention.

In another embodiment, the film of the present invention may have a layer formed using the surface-treating agent of the present invention and a base material for film. That is, the film of this embodiment may have the base material for film and a layer formed on the surface of the base material by using the surface-treating agent of the present invention. Although the base material for film is not limited, the base material for film may be formed of, for example, glass, quartz, aluminum oxide, zirconium oxide, metal (a simple substance of a metal such as aluminum, copper, iron, or nickel or a complex such as alloy thereof), fiber (a fabric, a non-woven fabric, or the like), resin (natural or synthetic resin such as a common plastic material), or the like. Examples of the resin include cellulose-based resin (for example, triacetyl cellulose (TAC)), polyolefin such as polyethylene, polypropylene, ethylene-propylene copolymer, and ethylene-vinyl acetate copolymer (EVA), cyclic polyolefins, modified polyolefin, polyvinyl chloride, polyvinylidene chloride, polystyrene, polyamide, polyimide, polyamide-imide, polycarbonate, poly-(4-methylpentene-1), ionomer, acrylic resin (for example, polymethyl methacrylate), acryl-styrene copolymer (AS resin), butadiene-styrene copolymer, ethylene-vinyl alcohol copolymer (EVOH), polyester such as polyethylene terephthalate (PET), polybutylene terephthalate (PBT), and polycyclohexane terephthalate (PCT), polyether, polyether ketone (PEK), polyetheretherketone (PEEK), polyetherimide, polyacetal (POM), polyphenylene oxide, modified polyphenylene oxide, polyarylate, aromatic polyester (liquid crystal polymer), polytetrafluoroethylene, polyvinylidene fluoride, and other fluororesin, various thermoplastic elastomer such as styrene-based, polyolefin-based, polyvinyl chloride-based, polyurethane-based, fluoro-rubber-based, and chlorinated polyethylene-based thermoplastic elastomer, epoxy resin, phenolic resin, urea resin, melamine resin, unsaturated polyester, silicone resin, polyurethane, and the like, and copolymer, blend, polymer alloy and the like composed mainly of these. These may be used singly, or may be used in combination of two or more (for example, in the form of a laminate of two or more layers). The resin is preferably at least one selected from the group consisting of a polycarbonate resin, an acrylic resin, a polyethylene terephthalate resin, a triacetyl cellulose resin, and a polyimide resin. The base material for film may be preferably formed of TAC (triacetyl cellulose), PET (polyethylene terephthalate), acrylic resin (for example, polymethyl methacrylate) or glass.

The layer formed using the surface-treating agent of the present invention can be formed by forming a film of the surface-treating agent of the present invention on the surface of the base material for film or the surface of the mold and post-treating this film if necessary.

The formation of the layer formed using the surface-treating agent of the present invention can be performed by applying the surface-treating agent on the surface of the base material for film or the surface of the mold such that the surface-treating agent coats the surface. Although the coating method is not limited, examples thereof include dip coating, spin coating, flow coating, spray coating, slit coating, roll coating, gravure coating, micro-gravure coating, bar coating, die coating, screen printing and a similar method.

For example, when the surface of the mold is coated, the surface-treating agent of the present invention may be applied to the mold surface directly (for example, application or the like), or after the surface-treating agent is coated on the surface of the base material for film, the base material may be brought into contact with the mold surface such that the film formed by the surface-treating agent is in contact with the mold surface.

It is preferable that the mold be subjected to a release treatment. When the mold has been subjected to the release treatment, the surface free energy of the mold can be decreased, and a fluorine-containing monomer can be suitably concentrated in the vicinity of the surface of the film (in particular, the layer formed using the surface-treating agent of the present invention) when the mold and the layer formed using the surface-treating agent are brought into contact with each other. The release treatment can also suitably prevent the fluorine-containing monomer from moving away from the vicinity of the surface of the film before the film is cured. As a result, the concentration of the fluorine atoms in the vicinity of the surface of the film can be suitably increased.

The release treatment is preferably a surface treatment with a silane coupling agent. The release treatment can be carried out, for example, by bringing a mold and a solution containing a silane coupling agent into contact with each other. Specifically, the solution containing a silane coupling agent is applied to the mold, or the mold is immersed in the solution containing a silane coupling agent, whereby the release treatment can be carried out.

As the silane coupling agent, a fluorine-based silane coupling agent is preferably used. Examples of the fluorine-based silane coupling agent include Optool DSX, Optool HD2100, Optool AES, KY-108, and KY-164.

The film post-treatment is performed, for example, by irradiation of an active energy ray, for example, an electromagnetic wave in the wavelength region of 380 nm or less, that is, an ultraviolet light, an electron beam, an X-ray, a γ-ray, etc., but is not limited thereto. By performing such post-treatment, curing of a curable moiety in the curable composition of the present invention (for example, the carbon-carbon double bond), and if present a curable moiety of the hard coating agent is initiated, so that a bond between these compounds or between these compounds and the base material is formed. Such post-treatment contributes to increasing of friction durability of the obtained film.

The film of the present invention has a concavity and convexity structure on the surface (for example, the surface of a layer formed using the surface-treating agent of the present invention). Examples of the concavity and convexity structure include a moth-eye structure. The height of the concavity and convexity structure (the height of the convexity) may be, for example, 0.001 mm or less. The interval between the pitches of the concavity and convexity structure may be, for example, 0.3 mm or less, or 0.1 mm or less.

The moth-eye structure can be formed using a mold having a concavity and convexity structure.

As the mold having the concavity and convexity structure, one manufactured by a manufacturing method provided by anodic oxidation of aluminum, for example, one manufactured by the following method can be used.

First, a substrate is produced by forming, on an aluminum substrate, a film of silicon dioxide ($SiO_2$) as an insulating layer and a film of pure aluminum in this order. At this time, for example, when the aluminum substrate is in a roll shape, the insulating layer and the pure aluminum layer can be continuously formed. Next, the pure aluminum layer formed on the surface of the substrate is alternately repetitively anodized and etched, so that a female die (mold) having a moth-eye structure can be produced.

In another embodiment, as the mold having the concavity and convexity structure, a mold manufactured by a photolithography method can be used. For example, the following method can be used.

First, by a photolithography method using a photomask, a pattern composed of a cylindrical fine concavity and convexity structure is formed on a glass substrate with a photosensitive resin to prepare a shape-master mold. For example, the cylinder may have a height of 0.001 mm, a diameter of 0.001 mm, and a pitch of 0.002 mm, a hexagonal close-packed arrangement may be adopted, and a region where concavity and convexity is formed may have a size of 150 mm×150 mm.

Next, nickel electroforming is applied to the obtained shape-master mold, whereby a nickel metal thin film (having a thickness of about 0.3 mm, for example) can be formed on the shape-master mold. The nickel thin film is carefully peeled off from the shape-master mold, whereby a thin plate on which a fine structure is formed can be obtained.

In the film of the present invention, the pencil hardness on the surface having a concavity and convexity structure can be improved. The pencil hardness of the surface of the film of the present invention is 2H or more, preferably 3H or more. The pencil hardness can be measured in accordance with JIS K 5600-5-4:1999.

In the film of the present invention, the water contact angle and the n-hexadecane contact angle on the surface having a concavity and convexity structure can be improved. The water contact angle on the surface of the film of the present invention is 140 degrees or more, and the n-hexadecane contact angle thereon is 70 degrees or more.

In the film of the present invention, the water contact angle is 140 degrees or more, preferably 150 degrees or more, more preferably 160 degrees or more. In the film of the present invention, the n-hexadecane contact angle is 70 degrees or more, preferably 80 degrees or more, and may be 88 degrees or more. In the film of the present invention, it is preferable that the water contact angle be 150 degrees or more and the n-hexadecane contact angle be 80 degrees or more, and it is more preferable that the water contact angle be 160 degrees or more and the n-hexadecane contact angle be 88 degrees or more. The contact angle can be measured, for example, based on a static contact angle measurement method to be described later.

In the film of the present invention, antifouling property (particularly fingerprint wiping property) on the surface having a concavity and convexity structure can be improved. The film of the present invention can have a surface with good antifouling property, and in particular can have a surface with good fingerprint wiping property. For example, even when the surface has a moth-eye structure, the antifouling property on the surface of the film of the present invention can be improved, and the fingerprint wiping property on the surface can be improved.

In the film of the present invention, the water contact angle on the surface having a concavity and convexity structure is 140 degrees or more, the n-hexadecane contact angle thereon is 70 degrees or more, and the pencil hardness thereon is 2H or more. In a more preferable embodiment, in the film of the present invention, the water contact angle on the surface having a concavity and convexity structure is 140 degrees or more, the n-hexadecane contact angle thereon is 70 degrees or more, and the pencil hardness thereon is 3H or more, and particularly preferably the water contact angle on the surface is 150 degrees or more, the n-hexadecane contact angle thereon is 80 degrees or more, and the pencil hardness thereon is 3H or more.

In another embodiment, in the film of the present invention, the water contact angle on the surface having a concavity and convexity structure is 160 degrees or more, the n-hexadecane contact angle thereon is 80 degrees or more, and the pencil hardness thereon is 2H or more, and particularly preferably the water contact angle on the surface is 160 degrees or more, the n-hexadecane contact angle thereon is 88 degrees or more, and the pencil hardness thereon is 3H or more.

In a particularly preferable embodiment, in the film of the present invention, the water contact angle on the surface having a concavity and convexity structure of a layer formed using the surface-treating agent of the present invention is 140 degrees or more, the n-hexadecane contact angle thereon is 70 degrees or more, and the pencil hardness thereon is 2H or more, and particularly preferably the water contact angle on the surface is 150 degrees or more, the n-hexadecane contact angle thereon is 80 degrees or more, and the pencil hardness thereon is 3H or more.

In another preferable embodiment, in the film of the present invention, the water contact angle on the surface having a concavity and convexity structure of a layer formed using the surface-treating agent of the present invention is 160 degrees or more, the n-hexadecane contact angle thereon is 80 degrees or more, and the pencil hardness thereon is 2H or more, and particularly preferably the water contact angle on the surface is 160 degrees or more, the n-hexadecane contact angle thereon is 88 degrees or more, and the pencil hardness thereon is 3H or more.

The film of the present invention has good reflectance and may have a low haze value. In addition, the permeability of the film of the invention can be improved.

In another embodiment, the film of the present invention is formed using the surface-treating agent of the present invention.

The film of this embodiment preferably has a layer formed using the surface-treating agent of the present invention. The film of this embodiment may be composed of a layer formed using the surface-treating agent of the present invention or may have a layer formed using the surface-treating agent of this embodiment and a base material for film. As the base material for film, one similar to those described above can be used.

For the formation of the layer formed using the surface-treating agent, the same method as described above can be used.

The film of this embodiment preferably has a concavity and convexity structure on the surface of the layer formed using the surface-treating agent of the present invention. Examples of the concavity and convexity structure include a moth-eye structure. The height of the concavity and convexity structure (the height of the convexity) may be, for example, 0.001 mm or less. The interval between the pitches of the concavity and convexity structure may be, for example, 0.3 mm or less, or 0.1 mm or less.

For the formation of the moth-eye structure, the same method as described above can be used.

In the film of this embodiment, the pencil hardness on the surface of the layer formed using the surface-treating agent of the present invention may be 2H or more and is preferably 3H or more. Preferably, the water contact angle on the surface of the layer formed using the surface-treating agent of the present invention is 140 degrees or more, and the n-hexadecane contact angle thereon is 70 degrees or more.

In this embodiment, preferably, the water contact angle on the surface of the layer formed using the surface-treating agent of the present invention is 140 degrees or more, the n-hexadecane contact angle thereon is 70 degrees or more, and the pencil hardness thereon is 2H or more. More preferably, the water contact angle on the surface is 150 degrees or more, the n-hexadecane contact angle thereon is 80 degrees or more, and the pencil hardness thereon is 3H or more. Particularly preferably, the water contact angle on the surface is 155 degrees or more, the n-hexadecane contact angle thereon is 87 degrees or more, and the pencil hardness thereon is 3H or more. The pencil hardness and the contact angles can be measured using the above methods. In another embodiment, the water contact angle on the surface of the layer formed using the surface-treating agent of the present invention may be 160 degrees or more, the n-hexadecane contact angle thereon may be 80 degrees or more, and the pencil hardness thereon may be 2H or more, and, more specifically, the water contact angle on the surface may be 160 degrees or more, the n-hexadecane contact angle thereon may be 88 degrees or more, and the pencil hardness thereon may be 3H or more.

In a more preferable embodiment, the film of the present invention is formed using the following curable composition of the present invention. That is, the curable composition is one comprising a compound having a perfluoropolyether group and a curable moiety and a curable resin and/or a curable monomer. In this curable composition, an organic solvent having no radical reactive group is not substantially contained, the curable resin and/or the curable monomer has a halogen atom-containing (meth)acrylate monomer, and the halogen atom-containing (meth)acrylate monomer is a monomer in which a hydrogen atom bonded to a carbon atom at the α-position is substituted with a halogen atom. By forming a film using such a curable composition, the values of the water contact angle and the n-hexadecane contact angle on the surface of the film of the present invention can be particularly improved, and the pencil hardness on the surface of the film of the present invention can be particularly improved.

In a further preferable embodiment, the curable composition of the present invention used for the formation of the film of the present invention is formed using a production method including mixing a reactive composition, containing (A) a compound having a perfluoropolyether group and a curable moiety and (C) an organic solvent having no radical reactive group, with a solvent, forming a precipitate containing the component (A), separating the precipitate, and mixing the separated precipitate with (B) a curable resin and/or a curable monomer.

(Article)

The article of the present invention includes a base material and a layer (that is, a surface-treating layer) formed on the surface of the base material by using the curable composition of the present invention (hereinafter, the composition and the curable composition of the present invention are also generally referred to as a "surface-treating agent"). The curable composition of the present invention may be used as it is or may be mixed with other curable materials. This article can be produced, for example, as follows.

The curable material means a composition containing a compound having at least one carbon-carbon double bond which is, but not limited to, for example, a monofunctional and/or polyfunctional acrylate and methacrylate (hereinafter, acrylate and methacrylate also generally referred to as "(meth)acrylate"), a monofunctional and/or polyfunctional urethane (meth)acrylate, a monofunctional and/or polyfunctional epoxy (meth)acrylate. Examples of the curable material include, but are not limited to, a composition which is generally a hard coating agent or an antireflection agent, for example, a hard coating agent containing the polyfunctional (meth)acrylate or an antireflection agent containing a fluorine-containing (meth)acrylate. The hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel-Cytec Co., Ltd.; and as HR300 series (trade name) from Yokohama Rubber Co., Ltd. The antireflection agent is commercially available, for example, as Optool AR-110 (trade name) from Daikin Industries, Ltd.

First, the base material is provided. The base material usable in the present invention may be composed of any suitable material such as a glass, a resin (may be a natural or synthetic resin such as a common plastic material, preferably, a polycarbonate resin, a poly(meth)acrylate resin, a polyethylene terephthalate resin, a triacetyl cellulose resin, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member, a medical apparatus, a medical material, or the like.

For example, when an article to be produced is an optical member, a material constituting the surface of the base material may be a material for an optical member, for example, a glass or a transparent plastic. Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, specific specification, and the like of the article to be produced.

Next, the film of the above surface-treating agent of the present invention is formed on the surface of the base material, and the film is post-treated, as necessary, and thereby the surface-treating layer is formed from the surface-treating agent of the present invention.

The formation of the film of the surface-treating agent of the present invention can be performed by applying the above surface-treating agent to the surface of the base material such that the surface-treating agent coats the surface. The coating method is not limited. For example, a wet coating method can be used.

Examples of the wet coating method include dip coating, spin coating, flow coating, spray coating, roll coating, gravure coating, micro-gravure coating, bar coating, die coating, screen printing and a similar method.

When the wet coating method is used, the surface-treating agent of the present invention is diluted with a solvent, and then it is applied to the surface of the base material. As the solvent, the above-mentioned fluorine-containing organic solvent and fluorine-free organic solvent can be used. In view of stability of the surface-treating agent of the present invention and volatile property of the solvent, the following solvents are preferably used: an aliphatic perfluorohydrocarbon having 5 to 12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon; a hydrofluoroether (HFE) (for example, an alkyl perfluoroalkyl ether such as perfluoropropyl methyl ether ($C_3F_7OCH_3$), perfluorobutyl methyl ether ($C_4F_9OCH_3$), perfluorobutyl ethyl ether ($C_4F_9OC_2H_5$), and perfluorohexyl methyl ether ($C_2F_5CF(OCH_3)C_3F_7$) (the perfluoroalkyl group and the alkyl group may be straight or branched)), a hydrochlorofluorocarbon (ASAHIKLIN AK-225 (trade name)); a cellosolve-based solvent such as methyl cellosolve, ethyl cellosolve, methyl cellosolve acetate, ethyl cellosolve acetate; an ester-based solvent such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate; a propylene glycol-based solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether; a ketone-based solvent such as acetone, methyl ethyl ketone, methyl isobutyl ketone, 2-hexanone, cyclohexanone, methyl amino ketone, 2-heptanone; an alcohol-based solvent such as methanol, ethanol, propanol, isopropanol, butanol, diacetone alcohol; an aromatic hydrocarbons such as toluene and xylene; and the like. These solvents may be used alone or as a mixture of two or more compound. Among them, hydrofluoroether, the glycol-based solvent, the ester-based solvent, the ketone-based solvent and the alcohol-based solvent are preferable, and perfluorobutyl methyl ether ($C_4F_9OCH_3$) and/or perfluorobutyl ethyl ether ($C_4F_9OC_2H_5$), propylene glycol monomethyl ether, ethyl acetate, butyl acetate, propylene glycol monomethyl ether acetate, methyl ethyl ketone, methyl isobutyl ketone, and diacetone alcohol are particularly preferable.

Next, the film is post-treated. This post-treatment is performed by irradiation of, for example, an active energy ray, for example, an electromagnetic wave in the wavelength region of 380 nm or less, that is, an ultraviolet light, an electron beam, an X-ray, a γ-ray, etc., but is not limited thereto. By performing such post-treatment, curing of a curable moiety in the composition of the present invention (for example, the carbon-carbon double bond), and if present a curable moiety of the hard coating agent is initiated, so that a bond between these compounds or between these compounds and the base material is formed. Such post-treatment contributes to increasing of friction durability of the obtained surface-treating layer.

As described above, the surface-treating layer derived from the surface-treating agent of the present invention is formed on the surface of the base material to produce the article of the present invention. The surface-treating layer thus formed has high surface slip property (or lubricity, for example, wiping property of a fouling such as fingerprints and excellent tactile feeling in a finger) and high friction durability in addition to water-repellency, oil-repellency, and antifouling properties.

When the curable composition of the present invention is used, the value of a volatile organic substance (VOC) of the surface-treating layer after curing can be reduced. For example, when the surface-treating layer after curing is dried at 65° C. for 12 hours, the value of the volatile organic substance is preferably less than 5% by weight. The weight evaluation can be calculated based on a ratio of a difference between the weight before drying and the weight after drying relative to the weight before drying.

In another embodiment, the article of the present invention may include a base material and the film of the present invention formed on the surface of the base material.

EXAMPLES

Hereinafter, the present invention will be described more specifically with reference to Examples. The present invention is not limited to the following Examples.

[Viscosity Measurement]

The value of the viscosity (mPa·s) of the composition at 25° C. was measured using a vibration type viscometer SV-10 manufactured by A&D Company, Limited.

[Measurement of Content of Tin Atom]

The content of tin atoms in the composition was determined using an atomic absorption spectrometer (Z8000 manufactured by Hitachi, Ltd.).

[Measurement of Static Contact Angle and Sliding Angle]

The static contact angle and the sliding angle were measured by the following method using a fully automatic contact angle meter Drop Master 700 (manufactured by Kyowa Interface Science Co., LTD.).

The static contact angle was determined by dropping 2 μL of water or n-hexadecane from a microsyringe on a substrate having a cured film and placed horizontally, and taking a still image one second after the dropping by a video microscope.

The sliding angle was determined by the following method. In the case of using water, 20 μL of water was dropped from a microsyringe on a substrate having a cured film and placed horizontally, the substrate was inclined at a rate of 2° per second, and the state until droplets started to fall was recorded as a moving image by a video microscope. The moving image was reproduced, and the angle at which droplets started to fall was taken as the sliding angle. When no droplet fell even if the base material was inclined at 900, it was judged as "not falling."

Synthesis Example 1

In a reactor, 57 g of SUMIDUR N3300 (cyclic trimer of hexamethylene diisocyanate, manufactured by Sumitomo Bayer Urethane Co., Ltd., NCO group content being 21.9%) was dissolved in 1000 g of ZEORORA H (manufactured by Zeon Corporation), 0.1 g of dibutyltin dilaurate was added thereto, and while stirring at room temperature, a solution prepared by dissolving 244 g of $CF_3CF_2O$—$(CF_2CF_2CF_2O)_n$—$CF_2CF_2CH_2OH$ (n=11) in 300 g of ZEORORA H was added dropwise, followed by stirring at room temperature overnight. The mixture was warmed to 40 to 45° C., and 24.4 g of hydroxyethyl acrylate was added dropwise and stirred. The end point of the reaction was determined to be a point where NCO absorption completely disappeared by IR, and a PFPE-containing composition A having a solid content of 20% by mass was obtained. The viscosity of the composition A was 34 mPa·s, and the tin content relative to 100% by mass of the composition was 76 ppm by mass.

Synthesis Example 2

A reactor was charged with 200 parts by mass of a perfluoropolyether compound having hydroxyl groups at both ends represented by the following formula (e-1), 123.4 parts by mass of p-chloromethylstyrene, 0.06 parts by mass of p-methoxyphenol, 32.3 parts by mass of a 50% by mass aqueous solution of benzyltriethylammonium chloride, and 1.35 parts by mass of potassium iodide. Subsequently, stirring of the solution was initiated under air flow, the reactor was warmed to 45° C., and 9.2 parts by mass of a 49% by mass aqueous solution of sodium hydroxide was added dropwise. After the dropping was completed, the solution was heated to 60° C. and stirred for an hour. After that, 37.1 parts by mass of a 49% by mass aqueous solution of sodium hydroxide was added dropwise over 4 hours, and the reaction was then allowed to occur for 15 hours.

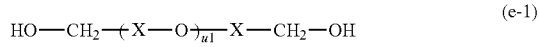
(e-1)

(In the formula, X represents a perfluoromethylene group and a perfluoroethylene group; and a single molecule has, on average, seven perfluoromethylene groups and eight perfluoroethylene groups.)

After the reaction was completed, the generated salt was separated by filtration, the filtrate was left to stand, and the supernatant liquid was removed. The resultant solution was washed three times with 500 mL of water. After this washing, the solution was further washed three times with 500 mL of methanol. The solution was then mixed with 0.06 parts by mass of p-methoxyphenol and 0.2 parts by mass of 3,5-t-dibutyl-4-hydroxytoluene (hereafter, abbreviated as "BHT") serving as polymerization inhibitors; and the solution was subsequently concentrated with a water bath set at 45° C. and a rotary evaporator to evaporate methanol. Thus, a compound having a poly(perfluoroalkylene ether) chain and styryl groups at both ends of the chain and represented by the following formula was obtained (hereafter, abbreviated as "compound (e-2)"). IR spectrum measurement indicated that the absorption peak at about 3400 cm$^{-1}$ derived from the hydroxyl groups of the perfluoropolyether compound having hydroxyl groups at both ends disappeared.

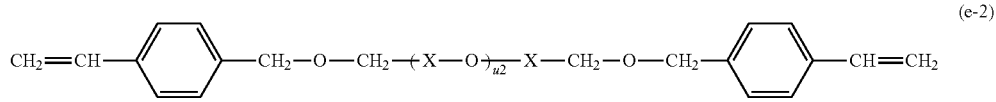
(e-2)

(In the formula, X represents a perfluoromethylene group and a perfluoroethylene group; and a single molecule has, on average, seven perfluoromethylene groups and eight perfluoroethylene groups.)

A reactor was charged with 80 parts by mass of methyl isobutyl ketone serving as a solvent. This solvent was heated to 105° C. while being stirred under nitrogen flow. Three solutions for dropping were then individually charged into separate dropping devices: a monomer solution in which 20 parts by mass of the compound of the compound (e-2) was dissolved in 20 parts by mass of methyl isobutyl ketone; a monomer solution in which 38.4 parts by mass of 2-hydroxyethyl methacrylate was dissolved in 38 parts by mass of methyl isobutyl ketone; and a polymerization initiator solution in which 8.8 parts by mass of t-butylperoxy-2-ethylhexanoate serving as a radical polymerization initiator was dissolved in 26 parts by mass of methyl isobutyl ketone. These solutions were simultaneously added dropwise over 2 hours while the internal temperature of the flask was maintained at 105° C. After the dropping was completed, the resultant solution was stirred at 105° C. for 10 hours, and a portion of the solvent was then evaporated under a reduced pressure. Thus, a polymer was obtained.

Subsequently, 0.3 parts by mass of p-methoxyphenol serving as a polymerization inhibitor and 0.03 parts by mass of dibutyltin dilaurate serving as a urethane-forming catalyst were added. Stirring of the solution was initiated under air flow. While the solution was maintained at 60° C., 41.6 parts by mass of 2-acryloyloxyethyl isocyanate was added dropwise over an hour. After the dropping was completed, the solution was stirred at 60° C. for an hour and then heated to 80° C. and stirred for 10 hours. Thus, IR spectrum measurement indicated that the absorption peak at about 2360 cm$^{-1}$ derived from the isocyanate group disappeared. Thus, a PFPE-containing composition B containing 50% by mass of PFPE was obtained. Thus, a methyl isobutyl ketone solution was obtained. The viscosity of the composition B was 63 mPa·s, and the tin content relative to 100% by mass of the composition was 139 ppm by mass.

Example 1

1300 g of 4-acryloyl morpholine was added to the PFPE-containing composition A of Synthesis Example 1 synthesized as described above, and ZEORORA H was distilled off while heating under reduced pressure. $^{19}$F-NMR confirmed that the peak of ZEORORA H reached the detection limit or less, and a PFPE-containing composition C having a solid content of 20% by mass was obtained. The viscosity of the composition C was 52 mPa·s, and the tin content relative to 100% by mass of the composition was 73 ppm by mass.

Example 2

A PFPE-containing composition D having a solid content of 40% by mass was obtained in the same manner as in Example 1 except that 650 g of 4-acryloylmorpholine was used. The viscosity of the composition D was 198 mPa·s, and the tin content relative to 100% by mass of the composition was 147 ppm by mass.

Example 3

200 g of 4-acryloylmorpholine was added to 100 g of the PFPE-containing composition B of Synthesis Example 2, and methyl isobutyl ketone was distilled off while heating under reduced pressure. $^{1}$H-NMR confirmed that the peak of methyl isobutyl ketone reached the detection limit or less, and a PFPE-containing composition E having a solid content of 20% by mass was obtained. The viscosity of the composition E was 46 mPa·s, and the tin content relative to 100% by mass of the composition was 134 ppm by mass.

Example 4

A PFPE-containing composition F having a solid content of 40% by mass was obtained in the same manner as in Example 2 except that 75 g of 4-acryloylmorpholine was used. The viscosity of the composition F was 153 mPa·s, and the tin content relative to 100% by mass of the composition was 263 ppm by mass.

Example 5

100 g of methanol was added to 50 g of the PFPE composition A synthesized according to Synthesis Example 1 while stirring at room temperature and then left to stand for 10 minutes to precipitate a white solid. Thereafter, an upper liquid layer was separated. After 40 g of ZEORORA H was added to the white solid to dissolve by stirring, 100 g of methanol was added, and the above operation was repeated.

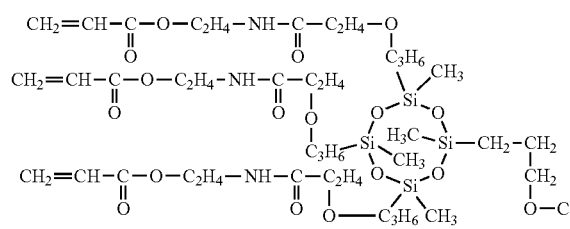

40 g of 4-acryloyl morpholine was added to the white solid, which was air-dried day and night at room temperature under light shielding, to dissolve, thereby obtaining a PFPE-containing composition G having a solid content of 20% by mass. The viscosity of the composition G was 49 mPa·s, and the tin content relative to 100% by mass of the composition was 1 ppm by mass or less.

Example 6

A PFPE-containing composition H having a solid content of 40% by mass was obtained in the same manner as in Example 5 except that 15 g of 4-acryloylmorpholine was used. The viscosity of the composition H was 187 mPa·s, and the tin content relative to 100% by mass of the composition was 1 ppm by mass or less.

Example 7

100 g of methanol was added to 50 g of the PFPE composition B synthesized according to Synthesis Example 2 while stirring at room temperature and then left to stand for 10 minutes to precipitate a white solid. Thereafter, an upper liquid layer was separated. After 40 g of methyl isobutyl was added to the white solid to dissolve by stirring, 100 g of methanol was added, and the above operation was repeated. 40 g of 4-acryloyl morpholine was added to the white solid, which was air-dried day and night at room temperature under light shielding, to dissolve, thereby obtaining a PFPE-containing composition I having a solid content of 20% by mass. The viscosity of the composition I was 39 mPa·s, and the tin content relative to 100% by mass of the composition was 1 ppm by mass or less.

Example 8

A PFPE-containing composition J having a solid content of 20% by mass was obtained in the same manner as in Example 7 except that 50 g of a mixed solution of methyl ethyl ketone and methyl isobutyl ketone having a solid content of 20% by mass of a PFPE-containing antifouling agent represented by the following formula (e-3) was used instead of the PFPE composition B. The viscosity of the composition J was 67 mPa·s, and the tin content relative to 100% by mass of the composition was 1 ppm by mass or less.

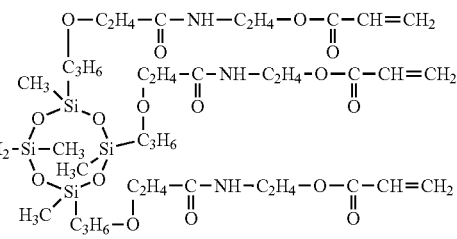

(e-3)

Example 9

100 g of methanol was added to 50 g of the PFPE composition A synthesized according to Synthesis Example 1 while stirring at room temperature and then left to stand for 10 minutes to precipitate a white solid. Thereafter, an upper liquid layer was separated. After 40 g of ZEORORA H was added to the white solid to dissolve by stirring, stirring with 100 g of methanol added, precipitation of a white solid, and separation of a liquid layer were carried out in the same manner as described above. 40 g of 2,2,3,3-tetrafluoropropyl acrylate was added to the white solid, which was air-dried day and night at room temperature under light shielding, to dissolve, thereby obtaining a PFPE-containing composition K having a solid content of 20% by mass. The viscosity of the composition K was 39 mPa·s, and the tin content relative to 100% by mass of the composition was 1 ppm by mass or less.

Example 10

A PFPE-containing composition L having a solid content of 40% by mass was obtained in the same manner as in Example 9 except that 15 g of 2,2,3,3-tetrafluoropropyl acrylate was used. The viscosity of the composition L was 57 mPa·s, and the tin content relative to 100% by mass of the composition was 1 ppm by mass or less.

Example 11

160 g of 2,2,3,3-tetrafluoropropyl acrylate was added to 200 g of the PFPE-containing composition A synthesized according to Synthesis Example 1, and ZEORORA H was distilled off while heating under reduced pressure. $^{19}$F-NMR confirmed that the peak of ZEORORA H reached the detection limit or less, and a PFPE-containing composition M having a solid content of 20% by mass was obtained. The viscosity of the composition M was 22 mPa·s, and the tin content relative to 100% by mass of the composition was 73 ppm by mass.

Example 12

A PFPE-containing composition N having a solid content of 20% by mass was obtained in the same manner as in Example 9 except that (3,3,4,4,5,5,6,6,6-nonafluorohexyl)-2-chloroacrylate was used instead of 2,2,3,3-tetrafluoropropyl acrylate. The viscosity of the composition N was 16 mPa·s, and the tin content relative to 100% by mass of the composition was 1 ppm by mass or less.

Example 13

A PFPE-containing composition O having a solid content of 40% by mass was obtained in the same manner as in Example 12 except that 15 g of (3,3,4,4,5,5,6,6,6-nonafluorohexyl)-2-chloroacrylate was used. The viscosity of the composition O was 28 mPa·s, and the tin content relative to 100% by mass of the composition was 1 ppm by mass or less.

Example 14

160 g of (3,3,4,4,5,5,6,6,6-nonafluorohexyl)-2-chloroacrylate was added to 200 g of the PFPE-containing composition A synthesized according to Synthesis Example 1, and ZEORORA H was distilled off while heating under reduced pressure. $^{19}$F-NMR confirmed that the peak of ZEORORA H reached the detection limit or less, and a PFPE-containing composition P having a solid content of 20% by mass was obtained. The viscosity of the composition P was 24 mPa·s, and the tin content relative to 100% by mass of the composition was 69 ppm by mass.

Example 15

A PFPE-containing composition Q having a solid content of 20 wt % was obtained in the same manner as in Synthesis Example 1 except that ZEORORA H of Synthesis Example 1 was changed to 1000 g of (3,3,4,4,5,5,6,6,6-nonafluorohexyl)-2-chloroacrylate. The viscosity of the composition Q was 38 mPa·s, and the tin content was 49 ppm.

Comparative Example 1

The composition A obtained in Synthesis Example 1 was used as the composition of Comparative Example 1.

Comparative Example 2

The composition B obtained in Synthesis Example 1 was used as the composition of Comparative Example 2.

[Evaluation of Properties of Hard Coat Cured Film with Composition Added]

120 mg of Irgacure 907 (manufactured by BASF) as a photoinitiator and the compositions A to N were added to 6.0 g of Beam Set 575CB (manufactured by Arakawa Chemical Industries, Ltd.) such that PFPE solid content of the compositions A to N was 5% by mass with respect to the total weight, respectively, and stirred for 10 hours by a rotary mixer while being shielded from light, thus obtaining PFPE-containing hard coat materials 1 to 14.

10 μL of the PFPE-containing hard coat material was placed on a slide glass, and a uniform coating was formed by a bar coater. The rays including UV light of 365 nm at an intensity of 500 mJ/cm$^2$ in a nitrogen atmosphere was irradiated to thereof, to cure the PFPE-containing hard coat materials 1 to 14. As Comparative Example 3, a cured film of Beam Set 575CB without PFPE solid content was used. The static contact angles and sliding angles of these cured films were measured. The appearance of the cured film was visually confirmed and evaluated as 1 when the cured film is transparent or 2 when the cured film is whitened.

The change in weight was evaluated as 1 when the numerical value of a volatile organic compound (VOC) obtained by the following formula was less than 5% by weight, or evaluated as 2 when the value was 5% by weight or more. The numerical value of VOC was calculated based on the change in weight when a surface-treating layer after curing was further dried at 65° C. for 12 hours, using the following formula.

VOC(%)=100×((weight before drying)−(weight after drying)/(weight before drying)

Peeling was evaluated based on the cross-cut method described in JIS K 5600. The case where peeling did not occur was evaluated as 1, and the case where peeling occurred was evaluated as 2.

The obtained results are shown in Table 1.

TABLE 1

| Compositions for measurement | Viscosity (mPa·s) | Content of tin atom (ppm) | Static contact angle (°) Water | Static contact angle (°) n-hexadecane | Sliding angle (°) Water | Sliding angle (°) n-hexadecane | Appearance | Weight reduction | Peeling |
|---|---|---|---|---|---|---|---|---|---|
| Composition C (Example 1) | 52 | 73 | 112 | 73 | 3 | 4 | 1 | 1 | 1 |
| Composition D (Example 2) | 198 | 147 | 113 | 72 | 3 | 3 | 1 | 1 | 1 |
| Composition E (Example 3) | 46 | 134 | 111 | 69 | 4 | Not fall | 1 | 1 | 1 |
| Composition F (Example 4) | 153 | 263 | 109 | 70 | Not fall | Not fall | 1 | 1 | 1 |
| Composition G (Example 5) | 49 | 1 or less | 114 | 73 | 3 | 3 | 1 | 1 | 1 |
| Composition H (Example 6) | 187 | 1 or less | 113 | 71 | 3 | 3 | 1 | 1 | 1 |
| Composition I (Example 7) | 39 | 1 or less | 110 | 70 | 5 | Not fall | 1 | 1 | 1 |
| Composition J (Example 8) | 67 | 1 or less | 112 | 72 | 3 | 3 | 1 | 1 | 1 |
| Composition K (Example 9) | 39 | 1 or less | 115 | 73 | 4 | 3 | 1 | 1 | 1 |

TABLE 1-continued

| Compositions for measurement | | Static contact angle (°) | | Sliding angle (°) | | | | |
|---|---|---|---|---|---|---|---|---|
| | Viscosity (mPa·s) | Content of tin atom (ppm) | Water | n-hexadecane | Water | n-hexadecane | Appearance | Weight reduction | Peeling |
| Composition L (Example 10) | 57 | 1 or less | 114 | 73 | 3 | 4 | 1 | 1 | 1 |
| Composition M (Example 11) | 22 | 73 | 109 | 72 | 3 | Not fall | 1 | 1 | 1 |
| Composition N (Example 12) | 16 | 1 or less | 117 | 75 | 3 | 3 | 1 | 1 | 1 |
| Composition O (Example 13) | 28 | 1 or less | 115 | 73 | 4 | 3 | 1 | 1 | 1 |
| Composition P (Example 14) | 24 | 69 | 114 | 73 | 4 | 6 | 1 | 1 | 1 |
| Composition Q (Example 15) | 38 | 49 | 116 | 73 | 3 | 3 | 1 | 1 | 1 |
| Composition A (Comparative Example 1) | 34 | 76 | 113 | 72 | 3 | 3 | 2 | 2 | 2 |
| Composition B (Comparative Example 2) | 63 | 139 | 112 | 71 | 4 | Not fall | 2 | 2 | 2 |
| Beam Set 575CB (Comparative Example 3) | — | — | 51 | 19 | Not fall | Not fall | 1 | 1 | 1 |

[Evaluation of Releasability]

1.0% by mass of each solid content of the compositions K to Q and 120 mg (2.0% by mass to PAK-02) of Irgacure 907 (manufactured by Ciba Specialty Chemicals Corporation) as a photoinitiator were added to 6.0 g of PAK-02 (manufactured by Toyo Gosei Co., Ltd.), and stirred for 12 hours using a rotary mixer while being shielded from light, thus obtaining mold resin materials 1 to 7. The mold resin material without antifouling composition was designated as Comparative Example 4.

10 μL of the above mold resin material was placed on a silicon substrate, a quartz mold having a line and space of 50 nm and an aspect ratio of 3.0 was overlaid thereon, and the mold resin material was sandwiched so as to spread uniformly between the mold and the silicon substrate. This was irradiated with rays including UV light of 365 nm at an intensity of 500 mJ/cm² in a nitrogen atmosphere from the quartz mold as the upper surface to cure the mold resin material. After curing, when the quartz mold was detached, a cured film remained on the silicon substrate. As the evaluation of releasability, removal of the cured film from the silicon substrate and adhesion of the cured film to the quartz mold were observed. As determination of releasability, the following two types of evaluations were performed. The obtained results are shown in Table 2.

Degree of Peeling of the Cured Film from the Silicon Substrate:

A: peeling of the cured film was not observed;

B: peeling of the cured film was observed.

Degree of Adhesion of the Cured Film to the Quartz Mold:

a: adhesion of the cured film to the quartz mold was not observed;

b: adhesion of the cured film to the quartz mold was observed.

TABLE 2

| | Compositions | Peeling of cured film from silicon substrate | Adhesion of cured film to quartz mold |
|---|---|---|---|
| Mold resin material 1 | Composition K | A | a |
| Mold resin material 2 | Composition L | A | a |
| Mold resin material 3 | Composition M | A | a |
| Mold resin material 4 | Composition N | A | a |
| Mold resin material 5 | Composition O | A | a |
| Mold resin material 6 | Composition P | A | a |
| Mold resin material 7 | Composition Q | A | a |
| Comparative Example 4 | (No composition) | B | b |

Example 2-1

A film having a moth-eye structure as a fine concavity and convexity pattern (this film is sometimes referred to as an antifouling film) was produced according to the method for producing an antifouling film including the following steps (a) to (f).

(a) Release Treatment for Moth-Eye Mold

Nickel moth-eye mold ARN 100-250 (manufactured by Soken Chemical & Engineering Co., Ltd.) was immersed in Optool HD-2100 for 5 minutes and then heated at 150° C. for 1 hour. After standing to cool, the mold was washed with Novec 7300 to complete the mold release treatment.

(b) Preparation of Resin 1

12.0% by mass of the PFPE-containing composition K and 2.0% by mass of Irgacure 907 (manufactured by BASF) were added to 86.0% by mass of Aronix UVX-6391 (manufactured by Toagosei Co., Ltd.). A product prepared by stirring the mixture under light shielding for 12 hours was designated as a resin 1.

(c) Application of Resin

The resin 1 was applied onto the surface of a TAC film using a bar coater.

(d) Formation of Moth-Eye Structure

The TAC film after the treatment of (c) was stretched using a hand roller while being pressed against the surface of the moth-eye structure subjected to the release treatment in the above (a) such that the surface having the resin 1 was in direct contact with the surface of the mold.

(e) Curing of Resin

After the treatment of the above (d), ultraviolet rays (irradiation amount: 1000 mJ/cm$^2$) including a wavelength of 365 nm were delivered from the TAC film side using a high-pressure mercury lamp to cure a layer formed from the resin 1. The thickness of the layer formed from the cured resin 1 (thickness of the convexity of the moth-eye structure formed in the layer) was 7 μm.

(f) Removal from Mold

The layer formed from the cured resin 1 and the TAC film were peeled off the moth-eye mold to produce an antifouling moth-eye film 1.

Example 2-2

A resin 2 was prepared in the same manner as in Example 2-1, except that the PFPE-containing composition N was used instead of the PFPE-containing composition K, and an antifouling moth-eye film 2 was produced using the resin 2.

Comparative Example 2-1

(g) Application of Resin

The PFPE-containing composition A was applied onto a concavity and convexity surface of the moth-eye mold, subjected to the release treatment in the same manner as in the above (a), by using an ultrasonic spray. Aronix UVX-6391 was applied onto the surface of the TAC film by a bar coater.

(i) Formation of Moth-Eye Structure

The TAC film on which Aronix UVX-6391 was applied was stretched by a hand roller while being pressed against the surface of the moth-eye mold on which the PFPE-containing composition A was applied.

(j) Curing of Resin

After the treatment of the above (i), ultraviolet rays (irradiation amount: 1000 mJ/cm$^2$) including a wavelength of 365 nm were delivered from the TAC film side using a high-pressure mercury lamp to cure a layer formed from the PFPE-containing composition A. The total thickness of the layer formed from the cured PFPE-containing composition A (the protrusions of the formed moth-eye structure) and the layer formed from Aronix UVX-6391 was 8 μm.

[Evaluation of Antifouling Properties]

As antifouling properties, the water contact angle, the n-hexadecane contact angle and the fingerprint wiping properties were evaluated. The results are shown in Table 3.

The measurement of the contact angle using water or n-hexadecane was carried out on the surface of each of the antifouling films formed in Examples 2-1 and 2-2 and Comparative Example 2-1 (the surface having a layer formed from the PFPE composition K, N, or A). The contact angle was measured in the same manner as the measurement of the static contact angle.

As the fingerprint wiping properties, it was evaluated whether or not fingerprints adhering to the surfaces of the antifouling films formed in Examples 2-1 and 2-2 and Comparative Example 2-1 could be wiped off.

Specifically, first, fingerprints were put on ten places on the surface of the antifouling film (the surface having the layer formed from the PFPE composition K, N, or A), and allowed to stand at room temperature for 24 hours. Thereafter, using the "Nepia Premium Soft Tissue" manufactured by Oji Nepia Co., Ltd., the surface of the antifouling film (the surface having the layer formed from the PFPE composition K, N, or A) was wiped ten times in one direction. Thereafter, the surface of the antifouling film was visually observed in an environment of an illuminance of 100 lx to evaluate whether or not dirt could be wiped off. The criteria for determination were as follows:

A: The dirt could be wiped off;
B: The dirt could not be wiped off.

Here, when the evaluation result was A, it was determined that an acceptable level (fingerprint wiping properties were excellent) was achieved.

[Evaluation of Surface Hardness]

The surface hardness was evaluated in accordance with Pencil Hardness: JIS K 5600-5-4:1999. The results are shown in Table 3.

[Evaluation of Reflectance]

A black acrylic plate "ACRYLITE (registered trademark) EX-502" manufactured by Mitsubishi Rayon Co., Ltd. was attached to a back surface of an antifouling moth-eye film (the surface in direct contact with the TAC film, and, in other words, the surface opposite to the side having the layer formed from the PFPE composition K, N, or A). Thereafter, visibility average reflectance (%) of each sample was measured using a visible ultraviolet spectrometer (U-4100 SPECTROMETER manufactured by Hitachi High-Tech Science Corporation) equipped with a 5° regular reflection unit. The results are shown in Table 3.

[Measurement of Transmittance and Haze Value]

The transmittance and the haze value were measured in accordance with ASTM D 1003 using Haze-gard II manufactured by Toyo Seiki Seisaku-sho, Ltd. The results are shown in Table 3.

TABLE 3

| | | Example 2-1 Composition K | Example 2-2 Composition N | Comparative Example 2-1 Composition A |
|---|---|---|---|---|
| | Reflectance (%) | 0.05 | 0.05 | 0.05 |
| | Haze value | 0.54 | 0.55 | 0.72 |
| | Transmittance (%) | 97.0 | 97.2 | 96.8 |
| Antifouling property | Water contact angle (°) | >160 | >160 | 152 |
| | n-hexadecane contact angle (°) | 89 | 88 | 86 |
| | Fingerprint wiping properties | A | A | B |
| Surface hardness | Pencil hardness | 3H | 3H | B |

INDUSTRIAL APPLICABILITY

The present invention can be suitably used for forming a surface-treating layer on a surface of various base materials.

The present invention includes following embodiments:

Embodiment 1. A curable composition comprising:
  a compound having a perfluoropolyether group and a curable moiety; and
  a curable resin and/or a curable monomer,
  wherein an organic solvent having no radical reactive group is not substantially contained.

Embodiment 2. The curable composition according to Embodiment 1, wherein a viscosity at 25° C. is 5 to 100,000 mPa·s.

Embodiment 3. The curable composition according to Embodiment 1 or 2, wherein the compound having a perfluoropolyether group and a curable moiety further has a triisocyanate structure.

Embodiment 4. The curable composition according to Embodiment 1 or 2, wherein the compound having a perfluoropolyether group and a curable moiety further has an isocyanurate type polyisocyanate structure.

Embodiment 5. The curable composition according to any one of Embodiments 1 to 4, wherein the compound having a perfluoropolyether group and a curable moiety is contained at 5 to 80% by mass relative to the total amount of curable composition.

Embodiment 6. The curable composition according to any one of Embodiments 1 to 5, wherein the content of tin atoms, titanium atoms or zirconium atoms relative to 100% by mass of the curable composition is 10 ppm by mass or less.

Embodiment 7. The curable composition according to any one of Embodiments 1 to 6, wherein the curable resin and/or the curable monomer has a halogen atom-containing curable resin and/or a halogen atom-containing curable monomer.

Embodiment 8. The curable composition according to any one of Embodiments 1 to 7, wherein the curable resin and/or the curable monomer has a halogen atom-containing (meth) acrylate monomer.

Embodiment 9. The curable composition according to Embodiment 8, wherein the halogen atom-containing (meth) acrylate monomer is a monomer in which a hydrogen atom bonded to a carbon atom at an α-position is substituted with a halogen atom.

Embodiment 10. A process for producing a curable composition comprising:
  removing (C) an organic solvent having no radical reactive group from a mixture comprising
    a reactive composition comprising (A) a compound having a perfluoropolyether group and a curable moiety and (C) the organic solvent, and
    (B) a curable resin and/or a curable monomer.

Embodiment 11. A process for producing a curable composition comprising:
  mixing a reactive composition comprising (A) a compound having a perfluoropolyether group and a curable moiety and (C) an organic solvent having no radical reactive group with a solvent;
    forming a precipitate containing the component (A);
    separating the precipitate; and
    mixing the separated precipitate with (B) a curable resin and/or a curable monomer.

Embodiment 12. The process for producing a curable composition according to Embodiment 10 or 11, further comprising reacting (a1) a compound having an isocyanate group and (b1) a compound having an active hydrogen to obtain a component (A).

Embodiment 13. An article comprising:
  a base material; and
  a surface-treating layer which is derived from the curable composition according to any one of Embodiments 1 to 9 and formed on a surface of the base material.

Embodiment 14. A film having a concavity and convexity structure on its surface,
  wherein pencil hardness on the surface is 2H or more, a water contact angle on the surface is 140° or more, and an n-hexadecane contact angle on the surface is 70° or more.

The invention claimed is:

1. A curable composition comprising:
  a compound having a perfluoropolyether group and a curable moiety; and
  a curable monomer,
  wherein an organic solvent having no radical reactive group is not contained at all or is contained in an amount of 1% by mass or less,
  wherein
    the compound having a perfluoropolyether group and a curable moiety further has a triisocyanate structure or an isocyanurate type polyisocyanate structure,
    the curable monomer is a halogen-containing (meth) acrylate group-containing monomer in which a hydrogen atom bonded to a carbon atom at an α-position is substituted with a halogen atom, and
    the (meth)acryloyl group of the halogen-containing (meth)acrylate group-containing monomer is bonded with at least one fluorine atom-substituted alkyl group.

2. The curable composition according to claim 1, wherein a viscosity at 25° C. is 5 to 100,000 mPa·s.

3. The curable composition according to claim 1, wherein the compound having a perfluoropolyether group and a curable moiety further has a triisocyanate structure.

4. The curable composition according to claim 1, wherein the compound having a perfluoropolyether group and a curable moiety further has an isocyanurate type polyisocyanate structure.

5. The curable composition according to claim 1, wherein the compound having a perfluoropolyether group and a curable moiety is contained at 5 to 80% by mass relative to the total amount of curable composition.

6. The curable composition according to claim 1, wherein a content of tin atoms, titanium atoms or zirconium atoms relative to 100% by mass of the curable composition is 10 ppm by mass or less.

7. A process for producing the curable composition according to claim 1 comprising:
  removing (C) an organic solvent having no radical reactive group from a mixture comprising
    a reactive composition comprising (A) a compound having a perfluoropolyether group and a curable moiety and (C) the organic solvent, and
    (B) the curable monomer,
  wherein
    (A) the compound having a perfluoropolyether group and a curable moiety is obtained by reacting (a1) a compound having an isocyanate group and (b1) a compound having an active hydrogen,
    (a1) the compound having the isocyanate group is polyisocyanate,
    the curable monomer is a halogen-containing (meth) acrylate group-containing monomer in which a hydrogen atom bonded to a carbon atom at an α-position is substituted with a halogen atom, and the (meth)acryloyl group of the halogen-containing (meth)acrylate group-containing monomer is bonded with at least one fluorine atom-substituted alkyl group.

8. A process for producing a curable composition comprising:
mixing a reactive composition comprising (A) a compound having a perfluoropolyether group and a curable moiety and (C) an organic solvent having no radical reactive group with a solvent;
forming a precipitate containing the component (A);
separating the precipitate; and
mixing the separated precipitate with (B) a curable resin and/or a curable monomer.

9. An article comprising:
a base material; and
a surface-treating layer formed on a surface of the base material and which comprises a cured composition according to claim 1.

10. A film which comprises a cured composition according to claim 1 having a concavity and convexity structure on its surface, and which is formed from a curable composition comprising:
a compound having a perfluoropolyether group and a curable moiety and a curable monomer; and
a curable monomer,
wherein pencil hardness on the surface is 2H or more, a water contact angle on the surface is 140° or more, and an n-hexadecane contact angle on the surface is 70° or more,
the compound having a perfluoropolyether group and a curable moiety further has triisocyanate structure or an isocyanurate type polyisocyanate structure,
the curable monomer is a halogen-containing (meth)acrylate group-containing monomer in which a hydrogen atom bonded to a carbon atom at an α-position is substituted with a halogen atom, and
the (meth)acryloyl group of the halogen-containing (meth)acrylate group-containing monomer is bonded with at least one fluorine atom-substituted alkyl group.

11. The process for producing a curable composition according to claim 8, further comprising reacting (a1) a compound having an isocyanate group and (b1) a compound having an active hydrogen to obtain a component (A).

12. The curable composition according to claim 1, wherein the organic solvent having no radical reactive group is a solvent selected from the group consisting of hexane, cyclohexane, heptane, octane, nonane, decane, undecane, dodecane, mineral spirit, benzene, toluene, xylene, naphthalene, solvent naphtha, methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, ethyl 2-hydroxyisobutyrate, acetone, methyl ethyl ketone, methyl isobutyl ketone, 2-hexanone, cyclohexanone, methyl amino ketone, 2-heptanone, ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, ethylene glycol monoalkyl ether, methanol, ethanol, iso-propanol, n-butanol, isobutanol, tert-butanol, sec-butanol, 3-pentanol, octyl alcohol, 3-methyl-3-methoxybutanol, tert-amyl alcohol, tetrahydrofuran, tetrahydropyran, dioxane, N, N-dimethylformamide, N, N-dimethylacetamide, methyl cellosolve, cellosolve, isopropyl cellosolve, butyl cellosolve, diethylene glycol monomethyl ether, 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane, Zeorora H, HFE-7100, HFE-7200, and HFE-7300.

* * * * *